United States Patent
Dhaini et al.

(10) Patent No.: US 9,602,311 B2
(45) Date of Patent: Mar. 21, 2017

(54) DUAL-MODE NETWORK

(71) Applicant: The Board of Trustees of the Leland Stanford Junior University, Palo Alto, CA (US)

(72) Inventors: Ahmad R. Dhaini, Kitchener (CA); Marc De Leenheer, Sunnyvale, CA (US); Leonid G. Kazovsky, Los Altos, CA (US); Thomas Shunrong Shen, Stanford, CA (US); Shuang Yin, Stanford, CA (US); Benjamin A. Detwiler, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 27 days.

(21) Appl. No.: 14/616,398

(22) Filed: Feb. 6, 2015

(65) Prior Publication Data

US 2015/0222361 A1    Aug. 6, 2015

Related U.S. Application Data

(60) Provisional application No. 61/936,629, filed on Feb. 6, 2014.

(51) Int. Cl.
*H04B 10/27* (2013.01)
*H04L 12/64* (2006.01)
(Continued)

(52) U.S. Cl.
CPC ......... *H04L 12/6418* (2013.01); *H04B 10/27* (2013.01); *H04J 14/0282* (2013.01); *H04Q 11/0066* (2013.01); *H04Q 11/0067* (2013.01)

(58) Field of Classification Search
CPC ....................................... H04B 10/27–10/278
(Continued)

(56) References Cited

U.S. PATENT DOCUMENTS 6,362,908 B1 * 3/2002 Kimbrough .......... H04B 10/272
398/164
7,007,297 B1 * 2/2006 Woodward ............... H04N 7/22
348/E7.052

(Continued)

FOREIGN PATENT DOCUMENTS

CA      2092297 A1    4/1992
WO      9207432 A1    4/1992

OTHER PUBLICATIONS

Chan: "Optical Switching Networks", Proceedings of the IEEE, May 2012, pp. 1079-1091.*

(Continued)

*Primary Examiner* — Li Liu
(74) *Attorney, Agent, or Firm* — Crawford Maunu PLLC

(57) ABSTRACT

Aspects of the present disclosure are directed toward apparatuses, systems, and methods that include a first gateway circuit in an optical access network connecting a plurality of end-of-network users to a central node, the first gateway circuit connecting one of the plurality of end-of-network users to the central node via fiber optic data lines. Further, the first gateway circuit is configured and arranged to: relay a first set of data between the end-of-network user and the central node using a packet-switching communication protocol, and relay a second set of data between the end-of-network user and the central node using an optical flow switching communication protocol.

20 Claims, 18 Drawing Sheets

(51) Int. Cl.
*H04Q 11/00* (2006.01)
*H04J 14/02* (2006.01)

(58) Field of Classification Search
USPC .................................................. 398/45–101
See application file for complete search history.

(56) References Cited

U.S. PATENT DOCUMENTS

| | | | | |
|---|---|---|---|---|
| 2002/0063924 | A1* | 5/2002 | Kimbrough | H04B 10/272 398/79 |
| 2002/0196491 | A1* | 12/2002 | Deng | H04B 10/272 398/79 |
| 2004/0184806 | A1* | 9/2004 | Lee | H04H 20/42 398/79 |
| 2005/0069317 | A1* | 3/2005 | Lee | H04J 14/0226 398/67 |
| 2005/0069318 | A1* | 3/2005 | Lee | H04J 14/0226 398/67 |
| 2005/0175035 | A1* | 8/2005 | Neely | H04Q 11/0067 370/486 |
| 2006/0002706 | A1* | 1/2006 | Lee | H04J 14/0226 398/71 |
| 2008/0304830 | A1* | 12/2008 | Huang | H04J 14/0226 398/79 |
| 2009/0060509 | A1* | 3/2009 | Shimoosako | H04J 3/1694 398/66 |
| 2009/0087179 | A1* | 4/2009 | Underwood | H04J 3/1694 398/25 |
| 2009/0232498 | A1* | 9/2009 | Tsuge | H04L 41/0226 398/58 |
| 2010/0054740 | A1* | 3/2010 | Lee | H04J 14/0226 398/68 |
| 2010/0290782 | A1* | 11/2010 | Lee | H04B 10/272 398/58 |
| 2011/0129226 | A1* | 6/2011 | Vleugels | H04B 10/25753 398/66 |
| 2014/0363163 | A1* | 12/2014 | Morper | H04L 45/38 398/58 |
| 2015/0295821 | A1* | 10/2015 | Huang | H04L 45/50 398/49 |

OTHER PUBLICATIONS

Chan, V. W. S., "Optical Flow Switching Networks," Proc. IEEE, 100(5), 1079-1091 (2012).
Weichenberg, G., Chan, V. W. S. and Medard, M., "Design and analysis of optical Flowswitched networks," IEEE J. Opt. Commun. Netw., 1(3), 81-97 (2009).
Choi, K. M., Moon, J. H., Lee, J. H. and Lee, C. H., "An Evolution Method from a TDM-PON with a Video Overlay to a WDM-PON," IEEE Photonics Technol. Lett., 20(4), 312-314 (2008).
Huang, H. P., "Transport layer protocol design over flow-switched data networks," Thesis (S.M.), Massachusetts Institute of Technology, Dept. of Electrical Engineering and Computer Science, 1-136 (2012).
ITU-T Study Group 15, "Gigabit-capable passive optical networks (GPON): General characteristics," Recommendation ITU-T G.984. 1, 1-33 (2008).
Kazovsky, L. G., Dhaini, A. R., De Leenheer, M., Shen, T. S., Yin, S. and Detwiler, B. A., "UltraFlow Access Networks: A dual-mode solution for the access bottleneck," ICTON, Tu.C3.1, 1-4 (2013).
Kramer, G. and Mukherjee, B, "Supporting differentiated classes of service in Ethernet passive optical networks," IEEE J. Opt. Commun. Netw., 1(8), 280-298 (2002).
Hideaki Furukawa et. al., "Field trial of 160 Gbit/s DWDM-based opticalpacket switching and transmission", Opt. Express 16, 11487-11495 (2008).
Z. Rosberg et. al., "Flow Scheduling in Optical Flow Switched (OFS) Networks Under Transient Conditions," JLT 2011.
L.G. Kazovsky et al., "Next-Generation Optical Access Networks," JLT, vol. 25, No. 11, pp. 3428-3442, (2007).
B. Ganguly et al., "A scheduled approach to optical flow switching in the ONRAMP optical access network testbed," OFC 2002, pp. 215-216, Abstract Only.
J. Kim et al., "OBT: Optical Burst Transport in Metro Area Networks," IEEE Communications Magazine, vol. 45, No. 11, pp. 44-51, (2007), Abstract Only.
Dhaini, A. R., Assi, C. M., Maier, M. and Shami, A., "Dynamic Wavelength and Bandwidth Allocation in Hybrid TDM/WDM Ethernet Passive Optical Networks (EPONs)," J. Lightw. Technol., 25(1), 277-286 (2007).
Chen, B., Chen, J. and He, S., "Efficient and fine scheduling algorithm for bandwidth allocation in Ethernet passive optical networks," IEEE J. Sel. Topics Quantum Electron., 12(4), 653-660 (2006).
Kingston Technology, "Kingston HyperX 3K solid state drive," Datasheet, Sep. 19, 2013, http://www.kingston.com/us/ssd/hyperx (2013).
Chun-Kit Chan and Chinlon Lin, "Multi-wavelength optical access networks: Architectures and enabling techniques," invited paper in Proc. APOC, SPIE vol. 5282, 2003, pp. 5282-41, Abstract Only.
E.S. Son; K H. Han, J.K. Kim, Y.C. Chung, "Bidirectional WDM passive optical network for simultaneous transmission of data and digital broadcast video service," J Lightwave Technol., vol. 21, No. 8, Aug. 2003, pp. 1723 -1727, Abstract Only.
Y. Su, P. Hu, W. Hu, J. Zhang, L. Leng, H. He , X. Tian, Y Jin, "A Packet-Switched Waveband-selective PON Enabling Optical Internetworking among ONUs," in Proc. ECOC 2005, paper We4.P95.
C.-J. Chae, S-T. Lee, G.Y. Kim, and H. Park. "A PON system suitable for internetworking optical network units using a fiber Brag grating on the feeder fiber," IEEE Photon. Technol. Lett., vol. 11, No. 12, 1999, pp. 1686-1688, Abstract Only.
E. Wong and C-J. Chae, "CSMA/CD-based Ethernet passive optical network with optical internetworking capability among users," IEEE Photon. Technol. Lett., vol. 16, No. 9, 2004, pp. 2195-2197, Abstract Only.
Roland Ryf, Yikai Su, Lothar Moller, S. Chandrasekhar, Xiang Liu, David T. Neilson, and C. Randy Giles, "Wavelength Blocking Filter with flexible Data Rates and Channel Spacing," IEEE/OSA J. Lightwave Technol. vol. 23, No. 1 2005, pp. 54-61.
M. Jinno, "IP Traffic Offloading to Elastic Optical Layer Using Multi-flow Optical Transponder", ECOC Technical Digest, Jul. 2011.
Miyazawa et al., "Development of an Autonomous Distributed Control System for Optical Packet and Circuit Integrated Networks", J. Opt. Commun. Netw., vol. 4, No. 1, Jan. 2012.
Yin, et al., "UltraFlow Access Testbed: Experimental Exploration of Dual-Mode Access Networks", J. Opt. Commun. Netw., vol. 5, No. 12, Dec. 2013.

* cited by examiner

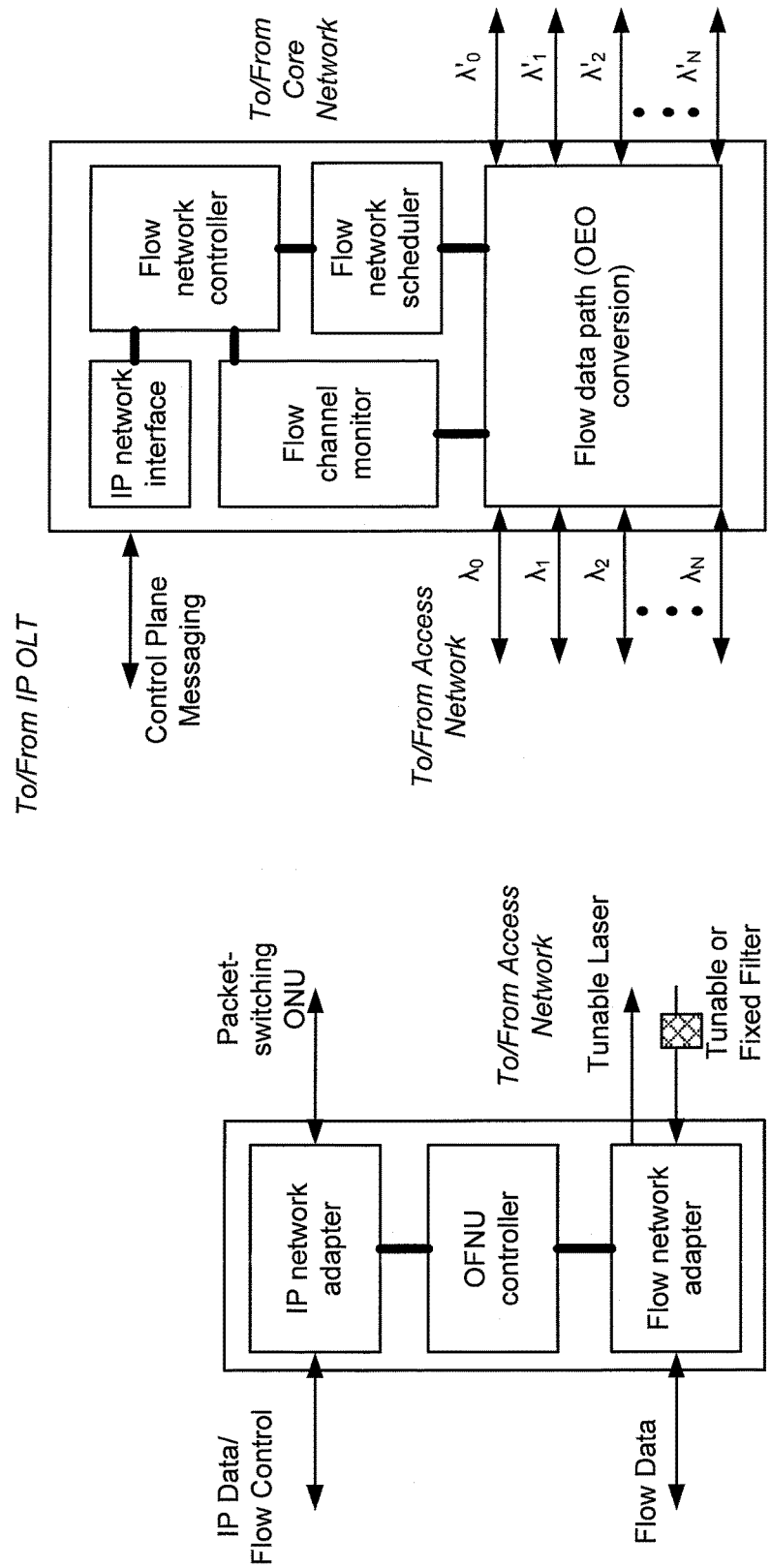

DUAL-MODE NETWORK

RELATED DOCUMENTS

This application claims the benefit under 35 U.S.C. 119(e) of U.S. Provisional Patent Application Ser. No. 61/936,629 filed on Feb. 6, 2014, and with ten Appendices; this provisional patent document and its appendices are fully incorporated herein by reference.

FEDERALLY-SPONSORED RESEARCH AND DEVELOPMENT

This invention was made with Government support under contract 1111374 awarded by the National Science Foundation. The U.S. Government has certain rights in the invention.

BACKGROUND

For over half a century, store-and-forward Electrical Packet Switching (EPS) with Layer 3 routing has been regarded as an efficient solution for relatively low-to-medium high-speed data transmission (≤1 Gb/s). However, the proliferation of bandwidth-intensive applications such as high-definition (HD) video streaming, large file transfer and high-speed data transmission (many Gbps) have been challenging the internet protocol (IP) routing overhead and EPS throughput. Optical Flow Switching (OFS) has been proposed as an efficient alternative to packet switching. OFS uses dedicated lightpaths and bypasses IP routers to enable efficient end-to-end optical communication for high volume transmission. For general information regarding OFS, reference may be made to Chan, V. W. S "Optical Flow Switching Networks," Proc. IEEE, 100(5), 1079-1091 (2012), which is fully incorporated by reference herein. These and other matters have presented challenges to data transmissions, for a variety of applications.

SUMMARY

Various example embodiments are directed to an optical access network architecture that provides dual-mode service that allows packet switching communications and OFS communications in the same optical distribution network (ODN). The present disclosure is exemplified in a number of implementations and applications, some of which are summarized below.

According to an example embodiment, an apparatus includes a first gateway circuit in an optical access network connecting a plurality of end-of-network users to a central node, the first gateway circuit connecting one of the plurality of end-of-network users to the central node via fiber optic data lines. The first gateway circuit is configured and arranged to relay a first set of data between the end-of-network user and the central node using a packet-switching communication protocol, and relay a second set of data between the end-of-network user and the central node using an optical flow switching communication protocol. In one such apparatus embodiment, the apparatus includes an optical flow network unit located at a location of the end-of-network user and configured and arranged to communicate data between the end-of-network user and the central node via the first gateway circuit using the optical flow switching communication protocol, and a packet-switching network unit located at a location of the end-of-network user and configured and arranged to communicate data between the end-of-network user and the central node via the first gateway circuit using the packet switching communication protocol.

Another apparatus embodiment includes a communication circuit configured and arranged to communicate data in an access network connecting a plurality of end-of-network users to a central node. The communication circuit has an optical flow network unit configured and arranged to communicate data between an end-of-network user and the central node in the access network using an optical flow switching communication protocol, and a packet switching network unit configured and arranged to communicate data between the end-of-network user and the central node in the access network using a packet switching communication protocol.

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the accompanying drawings.

FIG. 3A shows example function modules inside an optical flow network units (OFNUs), consistent with various aspects of the present disclosure;

FIG. 3B shows an example schematic illustration of a standalone optical flow line terminal (OFLT), consistent with various aspects of the present disclosure;

Figure 1:
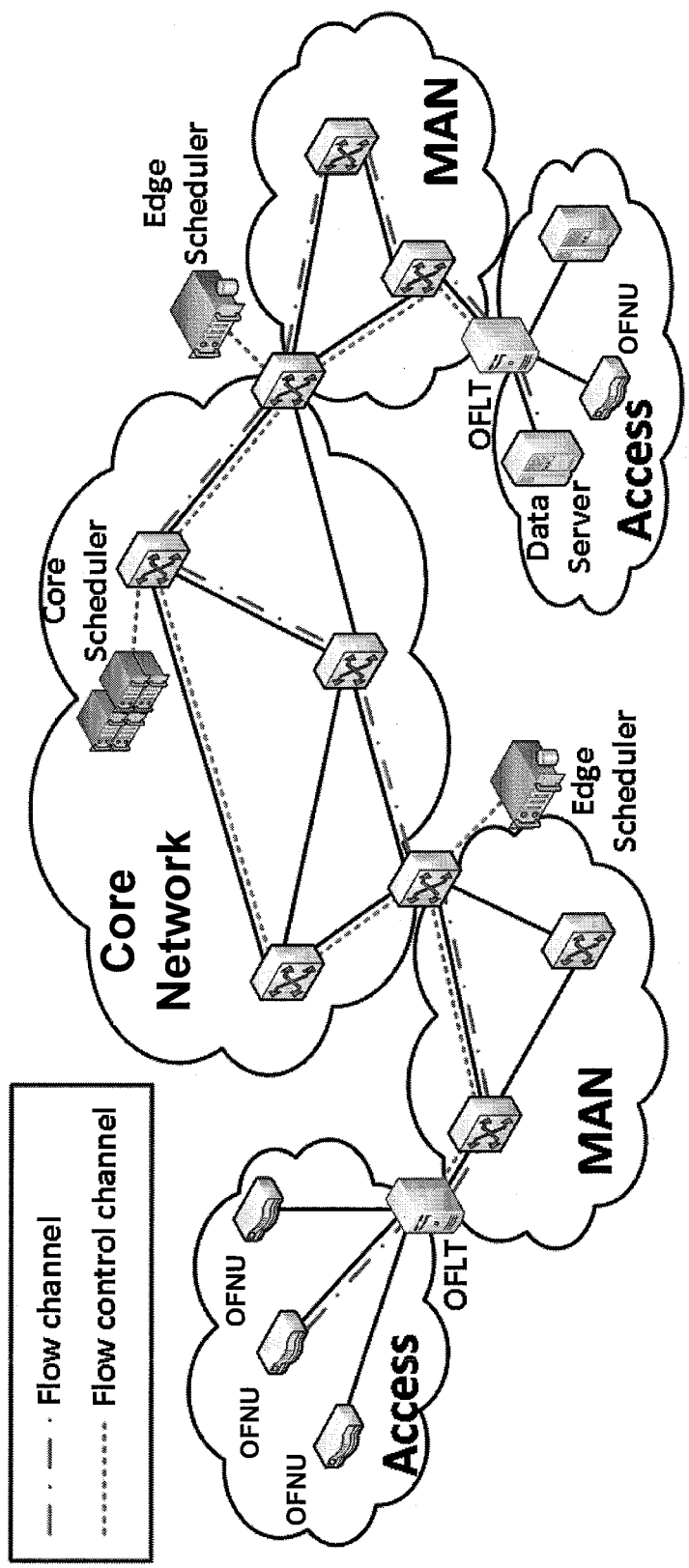
FIG. 1 shows two access networks connected through larger metro-area networks (MANs) to a core network, consistent with various aspects of the present disclosure.

While various embodiments discussed herein are amenable to modifications and alternative forms, aspects thereof have been shown by way of example in the drawings and will be described in detail. It should be understood, however, that the intention is not to limit the disclosures to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods involving dual-mode communication in an access network. While not necessarily so limited, various aspects may be appreciated through a discussion of examples using this context. In certain implementations, aspects of the present disclosure have been shown to be beneficial when used in context for communicating data to and from an end-of-network user in an access network using a dual-mode communication protocol. For example, in some embodiments, an apparatus is configured for dual-mode communication of data in an access network between an end-of-network user and a central node (e.g., a central office [CO]). More specifically, the apparatus is configured to transmit/relay data between the end-of-network user and the central node using either a packet-switching communication protocol (e.g., the IP) or an OFS communication protocol. For ease of reference, communications with the OFS communication protocol may be referred to as flow switching connections or flow connections, and such terms may be used interchangeably herein. While not necessarily so limited, various aspects may be appreciated through a discussion of examples using such exemplary contexts.

FIG. 1 shows two access networks connected through larger metro-area networks (MANs) to a core network. In each access network, a plurality of end-of-network users are connected to a central node, e.g., an optical flow line terminal (OFLT), via optical flow network units (OFNUs). The OFLTs of the access networks route data between the access network and respective MANs. The MANs may route data between respective central nodes of a plurality of optical access networks (e.g., located in respective locations of a city). As illustrated in FIG. 1, the MANs may connect access networks to a core network using optical-cross-connect switches (OXCs). The MANs include a central routing node configured to route data between the MANs and a core network connecting a plurality of MANs (e.g., located in respective cities). The core network includes OXCs configured to route data between metro-area/access networks connected thereto.

Unlike EPS, no buffering occurs between the source and destination for flow switching connections. A single flow switching connection is envisioned to remain in the network for a time period larger than 100 milliseconds (ms), for example. The scheduling of flow switching connections is conducted using a centralized core scheduler and network edge schedulers, which are coordinated through an electronic control plane (typically via legacy IP).

An optical access network architecture is disclosed that enables the OFS services and packets switching services over the same ODN, to offer dual-mode Internet access for its end-of-network users: packet switching and OFS. For ease of reference, the disclosed dual-mode network architecture may be referred to as the UltraFlow Access architecture.

In some embodiments, packet switching service is enabled via a legacy passive optical network (PON) that is integrated with the OFS service using new integrated optical access network architecture. For ease of explanation, the examples herein are primarily described with reference to a dual-mode network configured to communicate data using either of two communication protocols, namely a packet switching communication protocol and an OFS communication protocol. However, the contemplated embodiments are not so limited. Rather, the examples and embodiments may be adapted to provide a multi-mode network configured to communicate data using any of three or more communication protocols.

Figure 2A:
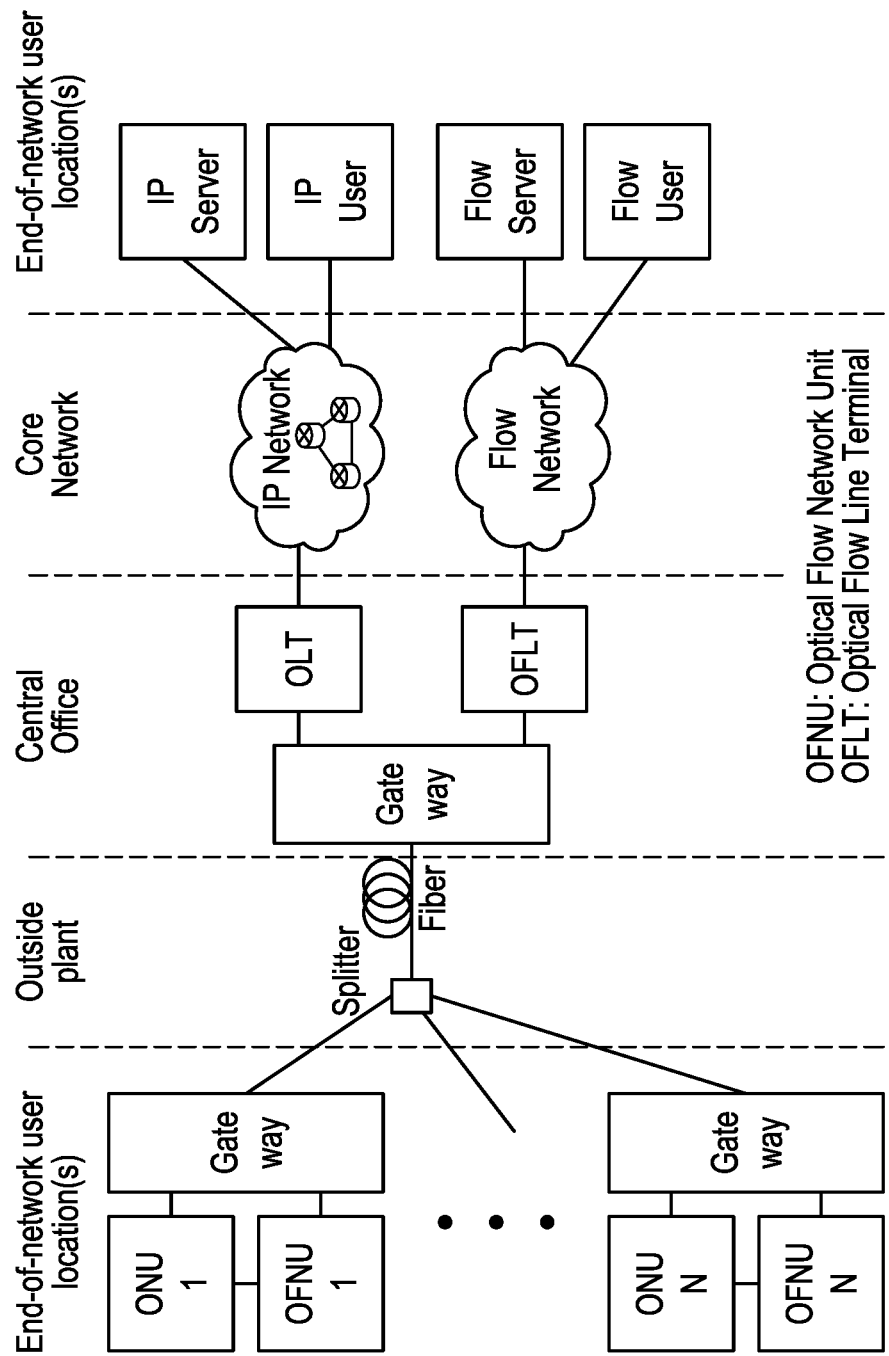
FIG. 2A shows an example access network configured for dual-mode communication, consistent with various aspects of the present disclosure.

FIG. 2A shows an example access network configured for dual-mode communication, in accordance with one or more embodiments. The access network is configured to communicate data between end-of-network users and a central node (e.g. central office). In this example, the access network includes N end-of-network users, each connected to a fiber network by a respective optical network unit (ONU), a respective optical flow network unit (OFNU), and a respective gateway. The ONU is configured to communicate data between the respective end-of-network user and the central office using a packed switching communication protocol (e.g., IP). The OFNU is configured to communicate data between the respective end-of-network user and the central office using an optical flow switching communication protocol.

In this example, the gateways at the end-of-network user locations are connected to a shared fiber optic line by a splitter. Each gateway is configured to relay the data communicated with the optical flow switching communication protocol between the OFNU and the central office via the splitter and fiber optic line. In this example, the gateway is also configured to relay the data communicated with the packed switching communication protocol between the ONU and the central office via the fiber network. However, in some embodiments, packet switching data may alternatively/additionally be communicated via another packed switching network (e.g., an electrical IP network).

At the central office, another gateway circuit routes packet switching data to an optical line terminal (OLT) and routes flow switching data to an optical flow line terminal (OFLT). OFLT is responsible for managing the OFNUs and for scheduling the optical flow requests sent by the OFNUs. When applicable, the OFLT communicates the flow switching data over a packet switching network portion of a core network to end-of-network users in another packet switching network. The OLT communicates the packet switching data over a packet switching network portion of a core network to end-of-network users in another packet switching network.

Communication in an access network can be classified as either Inter-PON or Intra-PON. Inter-PON communication refers to a scenario where the sender and receiver are located in different access networks, which are connected via the metro/core. Intra-PON Flow communication refers to a scenario where the sender and receiver are located in the same access network.

Figure 2B:
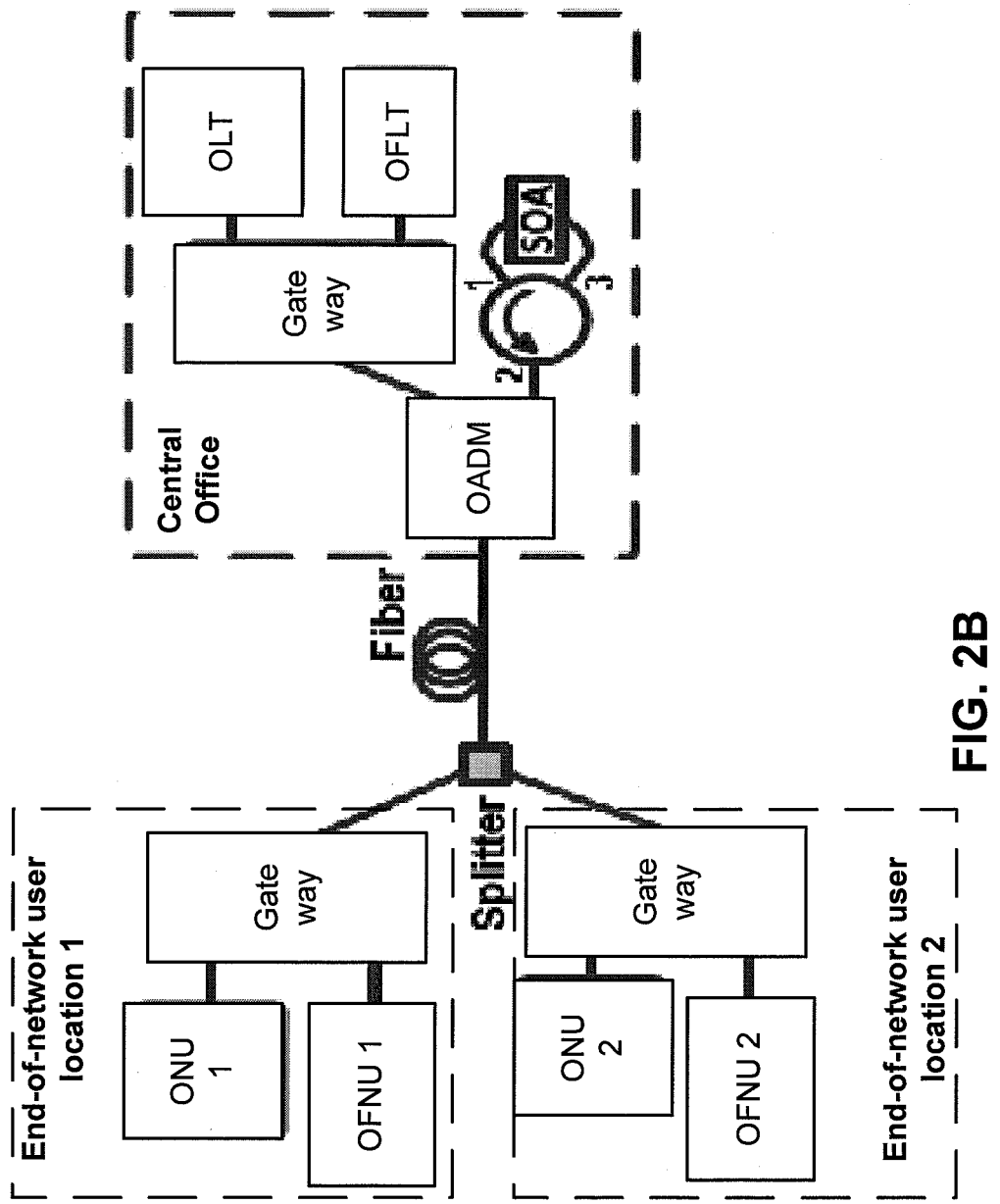
FIG. 2B shows an example access network configured for Inter-Passive Optical Network (PON) and Intra-PON Flow dual-mode communication, consistent with various aspects of the present disclosure.

FIG. 2B shows another access network configured for Inter-PON and Intra-PON Flow dual-mode communication. Similar to the example access network shown in FIG. 2A, the access network in this example includes respective sets of ONU, OFNU and Gateway circuits configured to connect a respective end-of-network user to a central office via a splitter and fiber optic line. As described with reference to FIG. 2A, the ONU, OFNU and Gateway circuits are configured to communicate data between an end-of-network user and a central office using either a packet switching communication protocol or using a flow switching communication protocol.

In this example, Intra-PON communication is enabled via a reflection point and medium. The reflection point is located at the central office right before the gateway, and the reflection medium consists of an optical add drop multiplexer (OADM), a circulator and a semiconductor optical amplifier (SOA).

Figure 2C:
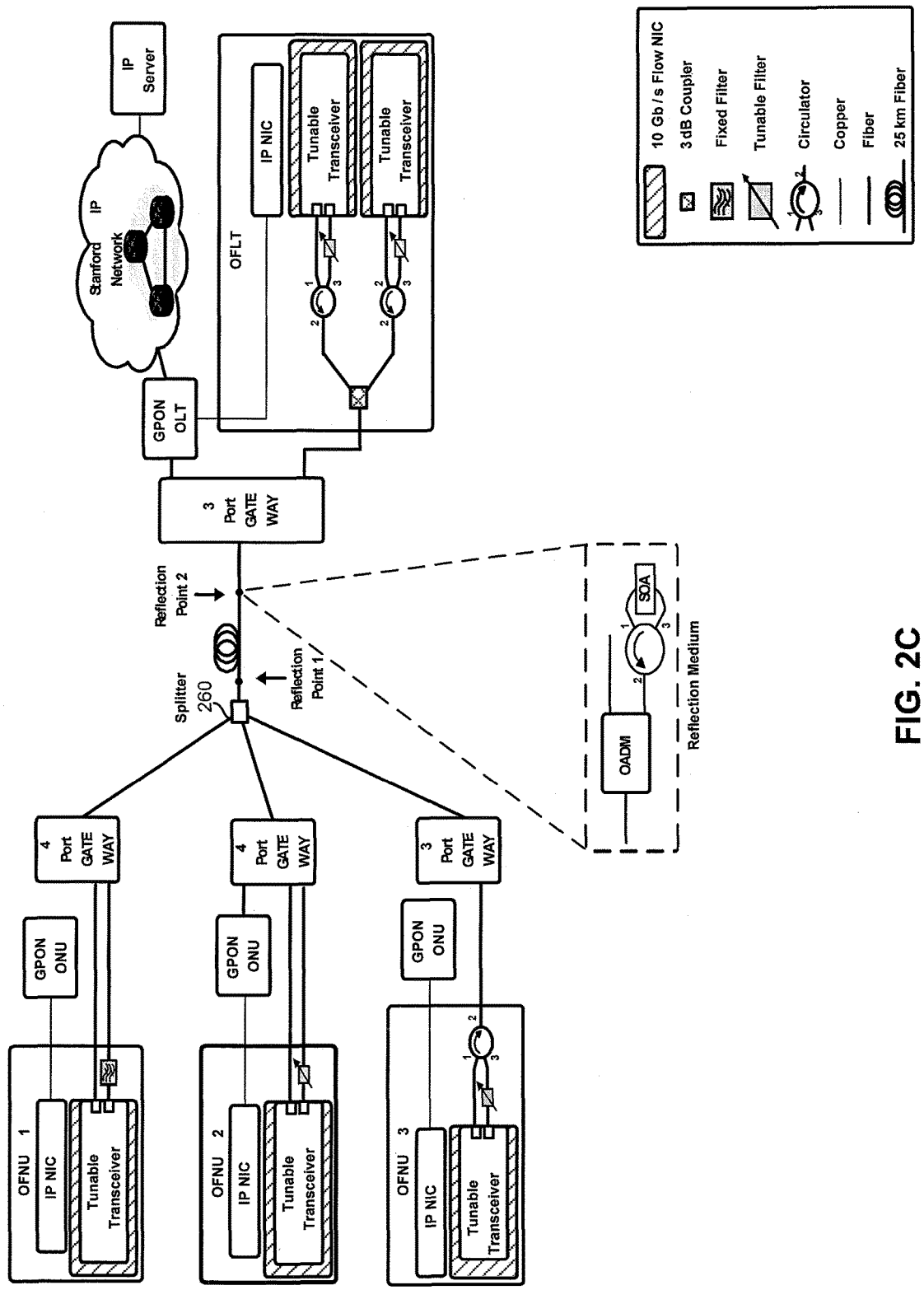
FIG. 2C shows an example dual-mode access network, consistent with various aspects of the present disclosure.

FIG. 2C shows another dual-mode access network implementation. Similar to the example access network shown in FIG. 2A, the access network in this example includes respective sets of ONU, OFNU and Gateway circuits configured to communicate data between respective end-of-network users and a central office, via a fiber optic line. As described with reference to FIG. 2A, the ONUs communicate data over the access network using packet switching; whereas, the OFNUs communicate data over the access network using optical flow switching. In this example, the ONUs are implemented similar to those used in legacy PONs (e.g., Gigabit-capable passive optical networks (GPON)), Gigabit Ethernet Passive Optical Networks [G-EPON]). In this example, three gateways each connect the OFNU/ONU of a respective end-of-network to a shared optical fiber via a splitter. The gateways relay data between the OFNU and an OFLT located at a CO, via a fiber optic line. As indicated above, in optical flow switching networks, data is communicated using scheduled communication channels/connections. The OFLT is responsible for managing the OFNUs and for scheduling optical flow switching connections. In some embodiments, the OFNUs communicate requests (flow connection requests) to establish optical flow switching connections using packed switching (e.g., via the ONU). In this example, the OFNUs each include a packet switching network card (IP NIC) configured to communicate control data (e.g., flow connection requests) via the ONU using packet switching. The components and operation of the OFNUs and OFLT in FIGS. 2A, 2B, and 2C are discussed in more detail in the following sections.

As indicated above, Intra-PON communication may be enabled by a reflection point included in the access network. The reflection point may be located at various points between a splitter and the gateway. In some embodiments, the reflection point may be located after the passive splitter. This location for the reflection point may not be suitable for already deployed PON infrastructures, as the installation cost can be high. However, several features such as low link loss and low power penalty can make it a promising solution. In some other embodiments, the reflection point is located at the central office right before the gateway at node. The reflection medium may consist of, for example, an optical add drop multiplexer (OADM), a circulator and a semiconductor optical amplifier (SOA). This second location for the reflection point may have lower installation cost, as all the operations happen in the CO. However, this second location requires amplifiers to compensate for double-distance fiber attenuation and twice the splitter loss. The second location may also exhibit power loss caused by stronger reflections (e.g., optical return loss [ORL] from fiber connectors and fiber Rayleigh backscattering [RBS]).

The ONU, OFNU and Gateway may be integrated into various devices in different embodiments. In some embodiments, the ONU, the OFNU and the Gateway are integrated in a single (dual-mode) device. In some embodiments, the OFNU and Gateway are integrated in a single device, where the interconnection with the ONU is external. In some embodiments, the ONU and gateway are integrated in a single device, and connect externally to the OFNU. Similarly, the OLT, the OFLT and the Gateway at the central office may be integrated into various devices in different implementations/applications. In other embodiments, the OLT, the OFLT and the Gateway are integrated in a single (dual-mode) device. In some embodiments, the OFLT and the Gateway are integrated in a single device, such that the interconnection with the OLT is external. Likewise, in a number of embodiments, the OLT and the Gateway are integrated in a single device, and connect externally to the OFLT.

For ease of explanation, the examples herein are primarily described with reference to an optical access network having optical fiber data lines connected to end-of-network user locations. However, the embodiments are not so limited. For instance, the examples may be applied to a hybrid fiber/coaxial access network (e.g., AT&T U-verse), where an optical connection from the ISP reaches the curb, and a copper/coaxial connection is used to communicate data between the optical connection and a home/building of the end-of-network user. In this architecture, the OFNU is implemented in a switch/node at the curb that transfers from the optical media to the copper one. For instance, a large file may be downloaded (in the downstream scenario) to the OFNU at the curb, and then quickly delivered to the end-of-network user over copper by maxing out the connection (e.g., using vectoring techniques over DSL, which achieves speeds up to 1 Gbps). The delivery of the data file over the copper domain of the network can either be done through an existing packet switching connection (e.g., an IP connection or via a sub-channel coexisting with the legacy IP connection).

While examples are primarily described with reference to OFNUs connected to a core network via an access network, embodiments are not so limited. In some embodiments, OFNUs reside in and can be connected to the core network directly. These OFNUs may be controlled via a core scheduler/server. This configuration may be used to improve communication speed in the core network.

Various embodiments may utilize different mechanisms to determine whether to communicate the data using the packed switching communication protocol (by the packet switching ONU) or using the OFS communication protocol (by the OFNU). In some embodiments, the determination is controlled by a control signal provided by an end-of-network user or client application on an end-of-network user machine. In other embodiments, the determination is made using a selection algorithm that determines whether to use the packed switching communication protocol or the OFS communication protocol based on various parameters/characteristics. For example, the selection algorithm may determine whether or not to use the OFNU for upstream/downstream communication based on: file size, IP network-wide traffic congestion (current and/or historic), bit error rates on flow switching channel (current and/or historic), quality of service deadlines and the user's permissiveness to miss the deadline, and/or contracted service level (e.g., service level agreement, pricing, etc.). Other parameters/characteristics may additionally or alternatively be used as well. The selection algorithm may be a deterministic algorithm or may be a self-learning algorithm configured to adapt its behavior to the usage patterns and preferences of a user(s).

As previously discussed, according to a number of embodiments the access network includes a plurality of end-of-network users, each connected to a fiber network by a respective optical network unit (ONU), a respective optical flow network unit (OFNU), and a respective gateway. The OFNU is the ingress/egress node of the entire UltraFlow access network and is responsible for the coordination of packet switching and optical flow switching access for the end-of-network users. The OFNU can be a standalone device attached to multiple backend users, an integrated box that includes the ONU functionalities, or a flow switching network interface card (NIC) installed on single machine.

FIG. 3(A) shows function modules inside an OFNU. The OFNU consists of two input/output pairs for packet switching and optical flow switching transmissions, respectively. The IP network adapter (e.g., a NIC) connects the IP interface of a user terminal to the ONU for regular packet switching network access, while the flow adapter and the tunable transceiver control the incoming/outgoing flow switching connections. In various embodiments, the IP network adapter is configured to communicate IP data to the packet switching ONU using an optical connection, electrical connection (e.g., copper), or a wireless connection.

An OFNU controller interconnects the flow and IP adapters, and constantly monitors the IP traffic so as to process corresponding control messages for flow switching connections while passing through the regular packet switched data (e.g., IP packets). If a flow switching connection is initialized, the flow switching connection request is queued and maintained at the OFNU controller until it is granted or declined. Once the flow connection request is granted, the end-of-network user is updated with the allocated start time and wavelength. At the transmission instant start time, the controller instructs the flow network adapter to tune into the assigned wavelength, and it sends a "turn off" signal to the adapter once the grant (i.e., time slot) expires. Unlike the ONU, no buffering occurs at the OFNU.

The example shown in FIG. 2C includes three different OFNU architectures that may be used in various embodiments. OFNU1 consists of a 10 Gbps tunable transceiver, a flow NIC and a fixed optical filter. The OFNU architecture shown in OFNU1 may be referred to as a colored design. The colored design provides a cheap and easy implementation. OFNU2 contains the same components as OFNU1, except for a tunable filter covering the C-band, which offers flexibility for the downstream flow switching transmission. The OFNU architecture shown in OFNU2 may be referred to as a partial colorless design. Unlike OFNU1 and OFNU2, OFNU3 employs a circulator to separate upstream and downstream flow switching traffic, and a 3-port Gateway to combine/separate packet switching and flow switching traffic, which offers full flexibility in wavelength assignment for bi-directional flow switching connections. The OFNU architecture shown in OFNU3 may be referred to as a full colorless design. The proposed colored and colorless OFNUs provide a tradeoff between flexibility and cost. Thus, the OFNU design can depend on the end-of-network user requirements, and installation and operation costs.

In some embodiments, the OFNU may include one or more additional port to those shown FIG. 3(A). For example, the OFNU may include ports to connect to a game console (e.g., XBOX, PS3/4, etc.) to transfer video games and media files. Some specific ports that may be provided include, but are not limited to, component video port, HDMI ports or DisplayPorts (to connect to a TV and directly watch movies/shows), USB ports, Ethernet ports, Thunderbolt ports and/or eSATA ports.

In some OFS approaches, the access network is assumed to be a "transparent continuation" of the metro-area/core networks, thereby having all the access network components fully transparent to the core and edge schedulers. However, transceivers at customer premises may not be able to operate on all the wavelengths available in metro-area/core networks. Enforcing a single wavelength across the whole network may increase the blocking probability of flow connection requests, thereby decreasing the network utilization. Also, the network is typically segmented and operated by different service providers (e.g., the core network by one provider, the metro-area network by another provider, and the Access network by yet another provider). Accordingly, local resources of each segment cannot be easily exposed to other segments in many configurations. In some embodiments, the OFLT is used as an interface to provide flexible and localized (i.e., in the Access domain) flow network management and operation.

Similar to the OFNU, the OFLT can either be a standalone device connected to the PON's OLT through copper wire (as in our testbed in FIG. 2C), or it could be part of a new device that integrates the functionalities of both the OLT and OFLT. FIG. 3(B) shows the schematic illustration of a standalone OFLT. One of its main functions is to manage the flow users in the UltraFlow Access network. Whenever an OFNU is newly connected to the UltraFlow Access network, it needs to be registered at the OFLT through a network discovery procedure similar to the one applied in legacy IP PON. User information, such as the supported wavelength(s), transmission rate and reconfiguration time of each OFNU, is maintained at the OFLT.

As part of its interfacing function, the OFLT captures all of the flow connection requests originated by the OFNUs, and then generates requests to the edge scheduler based on the flow information in the OFNU request. By doing so, the access network operator can effectively prevent disclosure of unnecessary user information to operators of metro-area and core-area network operators. Aggregation of flow switching traffic may also be implemented by sending a single request for multiple flow switching transmission periods to the edge scheduler. To eliminate the wavelength continuity constraint and thus reduce the flow connection request blocking probability, optical-to-electrical-to-optical (OEO) conversion devices are installed at the OFLT. Different wavelengths can be assigned in the UltraFlow access network in the same manner as in the MAN/WAN. In addition, optical performance monitoring functions, e.g., the optical signal-to-noise ratio, wavelength drift, etc., can also be implemented in the OFLT.

In FIG. 2C, the OFLT includes an IP NIC, a 3 dB coupler, several 10 Gbps C-band tunable transceivers (these define the access network capacity; e.g., 20 Gbps for two transceivers in FIG. 2C), tunable filters, and circulators.

Figure 4B:
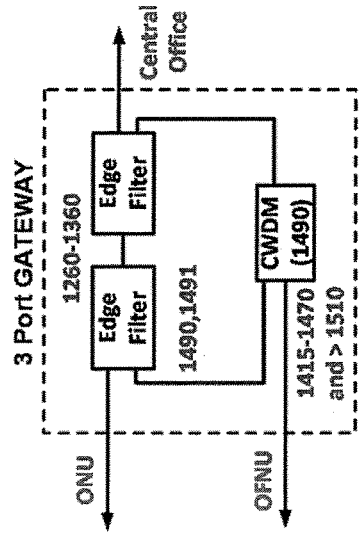
FIG. 4B shows an example of a 3-port gateway designed and implemented to separate/combine packet switching transmissions and optical flow switching transmissions based on different wavelengths utilized in both services, consistent with various aspects of the present disclosure.
Figure 4A:
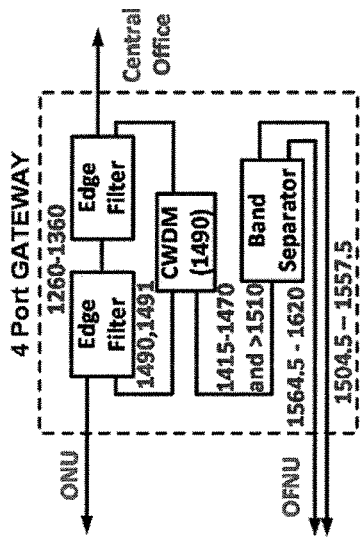
FIG. 4A shows an example of a 4-port gateway designed and implemented to separate/combine packet switching transmissions and optical flow switching transmissions based on different wavelengths utilized in both services, consistent with various aspects of the present disclosure.
Figure 4D:
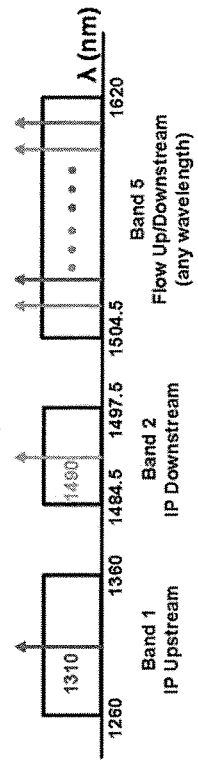
FIG. 4D shows an example wavelength assignment for the 3-port gateway, consistent with various aspects of the present disclosure.
Figure 4C:
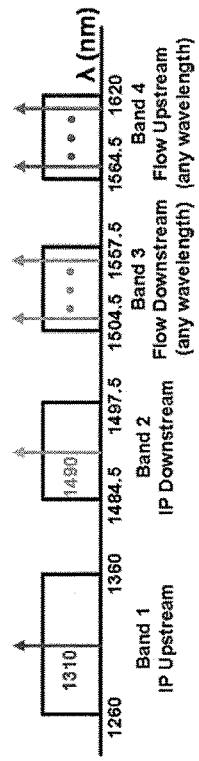
FIG. 4C shows an example wavelength assignment for the 4-port gateway, consistent with various aspects of the present disclosure.

Each gateway, in various embodiments, includes a circuit connecting one of the plurality of end-of-network users to the central node via fiber optic data lines. Example gateways include a 4-port and 3-port gateways, among others. The 4-port and 3-port gateways (see FIGS. 4(A) and (B)) are designed and implemented to separate/combine packet switching transmissions (e.g., IP protocol) and optical flow switching transmissions based on different wavelengths utilized in both services. The gateway separates downstream packet switching data from downstream flow switching data based on a frequency band used for the communication. Conversely, the gateway combines upstream packet switched data with upstream flow switching data based on a frequency band used for the communication. Specifically, a packet switching channel utilizes 1310 and 1490 nm for upstream and downstream respectively according to GPON standard, whereas flow switching channel uses full C-band for communications. The wavelength assignment for the 4-port and 3-port gateways is shown in FIGS. 4(C) and (D). The main difference between the two is that the former separates the C-band into two distinct bands (Band 3 for flow downstream and Band 4 for flow upstream); whereas with the latter, any wavelength on Band 5 can be used bidirectionally.

It is understood that other frequency bands may be used for communication of flow switching data. Moreover, in some embodiments, the frequency bands used for communication of data in the access network may differ from those used for communication in the MAN or core network. In some embodiments, the OFLT may perform wavelength translation between frequency bands used for communication in the Access network wavelengths, and frequency bands used for communication in the metro/core network. For additional information regarding wavelengths utilized in both services, reference may be made to Choi, K. M., Moon, J. H., Lee, J. H. and Lee, C. H., "An Evolution Method from a TDM-PON with a Video Overlay to a WDM-PON," IEEE Photonics Technol. Lett., 20(4), 312-314 (2008) and ITU-T Study Group 15, "Gigabit-capable passive optical networks (GPON): General characteristics," Recommendation ITU-T G.984.1, 1-33 (2008), both of which are fully incorporated by reference herein.

For example, in some embodiments, an apparatus comprising a gateway circuit in an optical access network connects one of a plurality of end-of-network users to a central node via fiber optic data lines. The gateway circuit is configured and arranged to relay a first set of data between the end-of-network user and the central node using a packet-switching communication protocol (e.g., the IP) or an OFS communication protocol. The gateway relays data over the fiber optic data lines, in various embodiments, using a plurality of frequency bands. As illustrated by FIGS. 4A-4D, for the data communicated using the packet-switching communication protocol, the gateway circuit is configured and arranged to relay data over the fiber optic data lines using a first set of frequency bands. For data communicated using the OFS communication protocol, the gateway circuit is configured and arranged to relay the data over the fiber optics lines using a scheduled one of a plurality of frequency bands, which do not include the first set of frequency bands. The first set of frequency bands, in some embodiments, includes a first frequency band that is in or overlaps with a frequency range which corresponds to wavelengths between 1260 and 1360 nanometers (nm) and a second frequency band that is in or overlaps with a frequency range which corresponds to wavelengths between 1484.5 and 1497.5 nm. Further, the plurality of frequency bands that are in or overlap with a frequency range include a range which corresponds to wavelengths between 1504.5 and 1620 nm.

The gateway circuit, in some embodiments, separates downstream data communicated from the central node with the packet switching communication protocol from downstream data communicated from the central node with the OFS communication protocol based on a frequency band used for the communication. Further, the gateway circuit combines upstream data communicated from the end-of-network user with the packet switching communication protocol from upstream data communicated from the end-of-network user with the OFS communication protocol based on a frequency band used for the communication.

It is understood that the examples and embodiments described herein may be adapted to implement various other features. For example, various techniques may be used to encode data for communication in the flow switching channel including but not limited to DWDM, OFDM and other any multiplexed techniques.

As another example, in some embodiments, an OFNU is configured to support multiple end-of-network users. For instance, the OFNU and OFLT are configured for multiplexing (in time or frequency domains) of requests and flow switching connections for multiple end-of-network users are connected to the OFNU. Through software virtualization techniques, full functionality of the OFNU can be provided to each individual user, such that each user thinks he has full control over the complete OFNU box. Intelligent resource scheduling may be implemented in the OFNU operating system level to enable this feature.

As yet another example, in some embodiments, multiple OFNUs are networked to create a "cloud of OFNUs" for distributed storage of large files. The location of a file is transparent to the user. Thus, files can be stored anywhere and are accessible from everywhere. With the ultra-fast sub-channel, a user can download/upload files to the "Cloud of OFNUs" instantly. A user also does not need to worry about any storage limitations that may be imposed by the design of a particular OFNU box.

The control plan in an UltraFlow network can be designed and/or operated in a variety of ways, in accordance with various embodiments. The UltraFlow network is ideal for continuous end-to-end flow switching transmission. Insertion of relatively small control frames into the flow switching data stream could be disruptive and may degrade the channel efficiency. Accordingly, in some embodiments, the control plane in UltraFlow is operated over legacy IP/EPS media, which is already optimized for the transmission of small packets. While not so limited, for ease of explanation, the control plane is primarily discussed with reference to the UltraFlow Access network (e.g., control between the OFNUs and the OFLT). For ease of reference, control messages for flow switching connections may be referred to as flow control messages.

Figure 5:
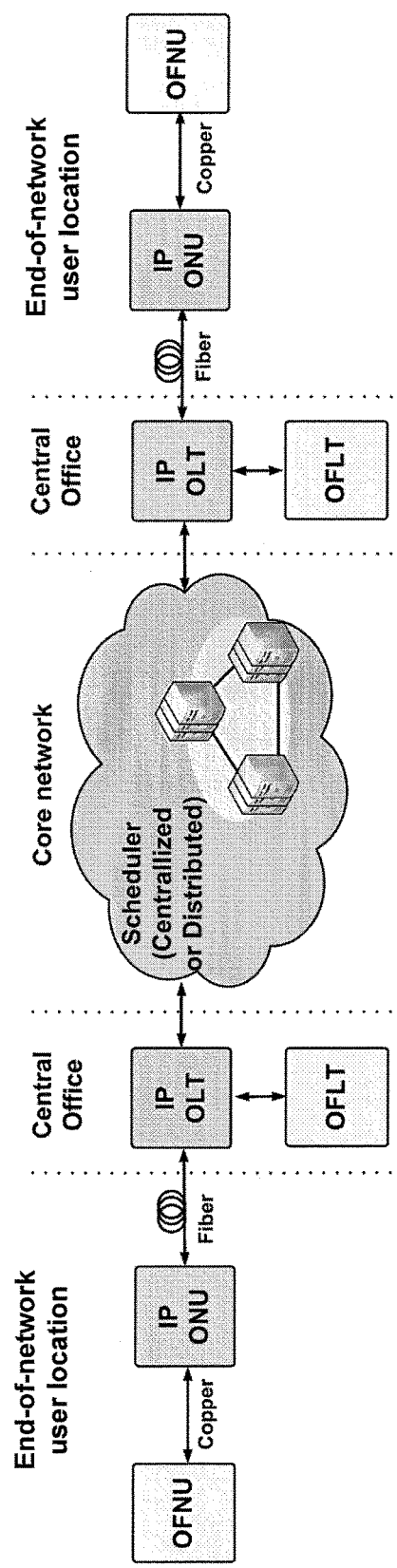
FIG. 5 shows an example communication between OFNUs, and optical network units (ONUs) in the control plane, consistent with various aspects of the present disclosure.

FIG. 5 illustrates communication between OFNUs, and ONUs in the control plane. As illustrated in FIG. 5, OFNUs and ONUs may be interconnected using standard Ethernet/Copper (if not otherwise integrated into a common device). Flow connection requests and control messages initiated by an OFNU, at the end-of-network user location, are first delivered to the ONU. Flow connection requests and control messages, are forwarded by the ONU to the central office using the optical IP (i.e., packet switching) channel. Upon arrival at the CO, flow control messages are filtered out by the OLT and sent to the OFLT. The OFLT uses the same IP path to reply to the flow control messages or send control signals to OFNUs. To communicate with the metro-area/core, flow control messages from the OFLT are first sent to the OLT from where they will be delivered to a management system using the same IP channel used between the OLT and the schedulers in the metro-area-core network.

Two methods are disclosed for support of the flow control messages in IP PONs. In the first method, flow control messages are dedicated a separate class of service (CoS) inside both the ONU and OLT so as to share the allocated PON time slot with other IP CoSs (i.e., voice, video and data). The second method extends the control protocols of legacy PONs (e.g., multipoint control protocol [MPCP] in EPON, and PLOAM in GPON) to avoid possible performance penalty caused by the first method due to mixing the flow control traffic with the regular packet switching traffic.

In the first method, flow control messages are embedded in the payloads of standard TCP/IP applications and are identified by their unique type. This approach requires the ONUs and OLT to filter out the received flow control packets and deliver them to the connected OFNU and OFLT respectively. Flow control packets are considered as a new CoS in IP PON. They are buffered at the ONU and OLT for upstream and downstream transmissions. To ensure low flow control packet latency, the flow control queue is set to the highest priority among all IP CoSs.

As mentioned above, mixing flow control traffic with regular IP traffic (i.e., packet switching traffic) may result in performance degradation for both types of service. Some approaches to simulate the effect of mixing flow control traffic with regular traffic use OMNET++. In such approaches, three IP classes of services, namely constant bit rate (CBR), variable bit rate (VBR) and best effort (BE), are transmitted in every Ethernet PON (which is the type of PON simulated) with and without the presence of flow control packets. All three types of services are modeled using the Pareto distribution with Hurst parameter H=0.8, whereas the arrival rate of flow connection requests is Poisson distributed. To stress test the IP channel, an approach can be used with 64 OFNUs connected to the OFLT. Each OFNU has a flow connection request rate of 10 requests/second, which is an aggressive request rate assuming that a typical flow connection lasts for hundreds of milliseconds. The dynamic bandwidth allocation (DBA) scheme proposed in Chen, B., Chen, J. and He, S., "Efficient and fine scheduling algorithm for bandwidth allocation in Ethernet passive optical networks," IEEE J. Sel. Topics Quantum Electron., 12(4), 653-660 (2006), which is fully incorporated by reference herein, is employed to perform intra-ONU and inter-ONU scheduling; it is an advanced DBA scheme that minimizes the packet delay in regular IP PONs. The CBR traffic occupies 20% of the overall IP network load and the rest is evenly divided between VBR and BE. The remaining parameters used for such an approach are listed in Table 1.

TABLE 1

Approach Parameters

| Parameters | Value |
| --- | --- |
| EPON bandwidth | 1 Gbps |
| Number of PONs | 2 |
| Number of ONUs per PON | 32 |
| Guard time | 1 μs |
| OLT/ONU queue size | 10 MB |
| Distance between ONUs and OLTs | 25 km |
| Downstream cycle time | 2 ms |

Figure 6:
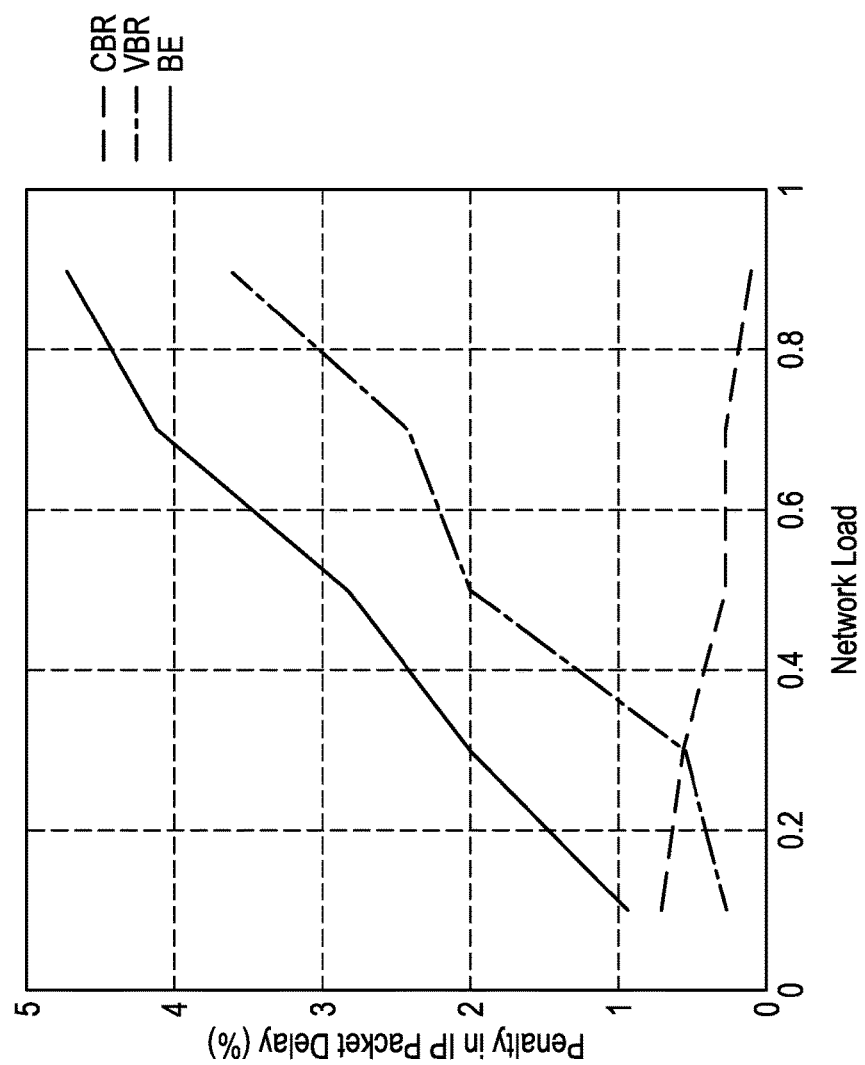
FIG. 6 shows an example penalty in IP packet delay resulting from the presence of flow control in the network, consistent with various aspects of the present disclosure.

Such an approach can result in a maximum delay of only 2 ms for flow control traffic under various IP network loads in both the upstream and downstream directions. FIG. 6 illustrates penalty in IP packet delay resulting from the presence of flow control in the network. As shown in FIG. 6, the maximum penalty in IP packet delay caused by the flow control packets is below 5%, even when the network load reaches 0.9. From this, one can conclude that with an intelligent DBA, the usage of an IP channel for the operation of the flow control protocol does not impair the quality-of-service (QoS) of regular IP traffic. Meanwhile, since the intra-ONU scheduling scheme attempts to maintain low CBR traffic delay, the additional traffic introduced by flow control does not hinder the performance of the ONU scheduler when the network load increases. Therefore, the penalty on IP packet delay of CBR traffic slightly decreases for high IP network loads.

As mentioned, the second method extends the control protocols of legacy IP PONs so as to eliminate the penalty caused by the first approach. The UltraFlow control protocol is then "understood" by the ONU and OLT at the expense of making it more complex than the standard protocol. Without loss of generality, this method can be applied to the MPCP in EPON. The same concepts can be extended to other PON standard protocols such as the physical layer operations and maintenance (PLOAM) protocol of GPON.

Figure 7:
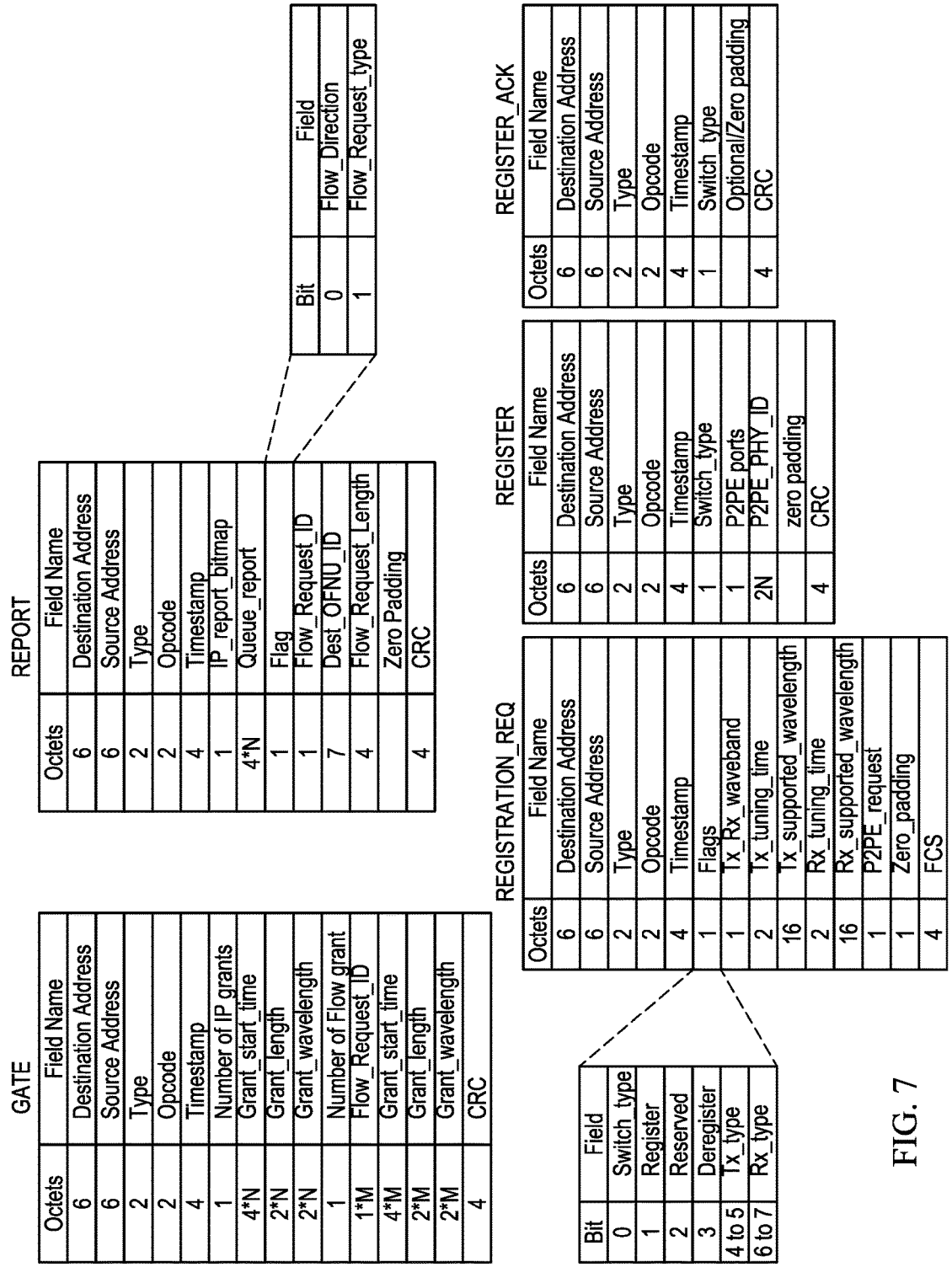
FIG. 7 shows example multipoint control protocol (MPCP) messages, consistent with various aspects of the present disclosure.

FIG. 7 shows examples of extended MPCP messages. The three messages for auto-discovery, REGISTER_REQ, REGISTER_ACK and REPORT, include an additional field Trans_mode, to indicate whether the new registered node is an ONU (i.e., Trans_mode=0) or an OFNU (i.e., Trans_mode=1). If the field is set to one, the ONU and OLT forward the messages to the corresponding OFNU or OFLT, respectively, instead of processing them. The REGISTER_REQ message also contains information about the OFNU transceiver's capability. Transceiver capabilities may include, for example, laser_tuning time and supported wavelength. The field Grant_wavelength is added in the GATE message to inform the OFNU about the assigned transmission wavelength. To pack the request and grant messages for both the flow switching and packet switching services into the same REPORT and GATE messages, respectively, the number of supported IP (i.e. packet switching) queues may be reduced. This is not an issue given that typically less than four out of the eight standard IP queues are used (i.e., CBR, VBR and BE) in legacy PONs. However, if an access network requires more IP queues to provision more classes of service, the size of the extended MPCP message can be increased to support the flow switching service, which may cause an additional control overhead in the network. Nevertheless, the impact of a slightly larger message size is equivalent to transmitting a small amount of additional control packets and therefore, should be minimal according to the simulation study in the previous section. On the other hand, flow switching connection requests/grants that cannot be accommodated in one REPORT/GATE message can be buffered at the OFNU/OFLT for transmission in the next upstream/downstream transmission cycle. Since the flow switching connection request rate per OFNU is lower than that of IP ONU (i.e., less than or equal to 10 requests/sec), the impact of packet delay due to buffering on flow switching transmission is also negligible given that each flow switching connection generally last for at least hundreds of milliseconds.

Compared to the first method, the second method for support of flow control messages in IP PONS has minimal to no impact on regular IP service, as it integrates the exchange and processing of control messages for both (IP services) and flow switching services. However, amendments to existing PON protocols in the ONUs and OLT are required even if the flow switching service is not employed in all premises. On the other hand, the first method only uses minor modifications at the end-of-network users that are subscribed to the flow switching service. This offers more flexibility in the UltraFlow access deployment, at the expense of slight performance degradation in the IP service. Thus, this method is more suitable for UltraFlow access deployments in areas that already have massive regular IP PON deployments. An example first method implemented, as described by Kramer, G. and Mukherjee, B, "Supporting differentiated classes of service in Ethernet passive optical networks," IEEE J. Opt. Commun. Netw., 1(8), 280-298 (2002), which is fully incorporated herein by reference, and did not result in any IP service or flow control performance degradation. The disclosed methods for communicating control data may also be applied for use in various networks and are not limited to the specific networks/configurations disclosed herein. For instance, some example networks that may be adapted to utilize the disclosed methods for communicating control data include, but are not limited to, optical burst switching (OBS) networks (e.g., with customized schedulers), optical transport networks (OTNs) (e.g., with logically centralized control using SDN concepts), and data networks offering bandwidth-on-demand style circuits (e.g., using a control plane based on GMPLS and SDN).

Figure 8A:
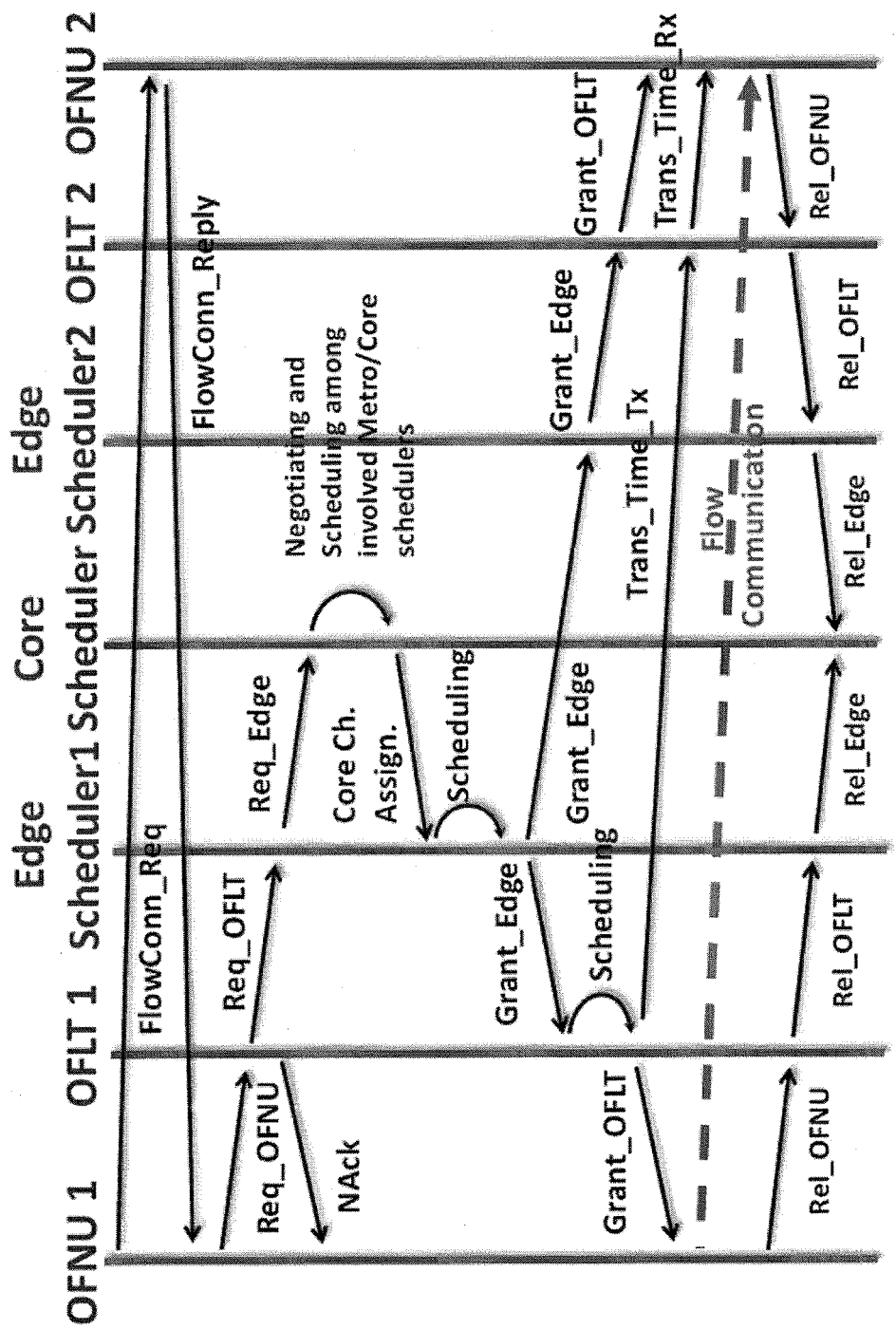
FIG. 8A shows an example process for establishing a flow switching connection using a distributed scheduling protocol, consistent with various aspects of the present disclosure.

Different embodiments may utilize various processes to schedule and establish a flow switching connection between two end-of-network users. FIG. 8(A) shows a first example process for establishing a flow switching connection using a distributed scheduling protocol. As illustrated in FIG. 8(A), the flow switching connection is initiated by negotiation between two end-of-network users regarding transmission authorization, transmission period, etc., through the regular IP channel. Upon agreement, the upstream user sends a request to the connected OFNU from where the request is forwarded to OFLT through the IP PON. If the request has an expiration time, OFLT checks for available local channels within the time window. In the case that no channel is dispensable within the dual-mode access network at the time, the OFLT returns a negative acknowledgment (NACK) to OFNU. Otherwise, it is delivered to the edge scheduler. The edge scheduler periodically sends requests for inter-MAN connections to the core scheduler that replies with the route and wavelength in WAN. Subsequently, the edge scheduler schedules the time slot of each received flow switching connection request and forwards the results to the destination MAN. The edge scheduler also sends the local wavelength assignment along with the transmission time slot to the dual-mode access network where the request is originated. Upon the reception of a flow grant, OFLT assigns the wavelength for flow switching transmission in the dual-mode access as it sees appropriate. During the whole scheduling process, if a scheduler finds no available flow switching resources, the granted channel will be set to negative one. Both OFNU and OFLT send a Release message after the completion of each flow switching transaction. In contrast, the edge schedulers do not send the release message until the granted inter-MAN connections have expired.

Figure 8B:
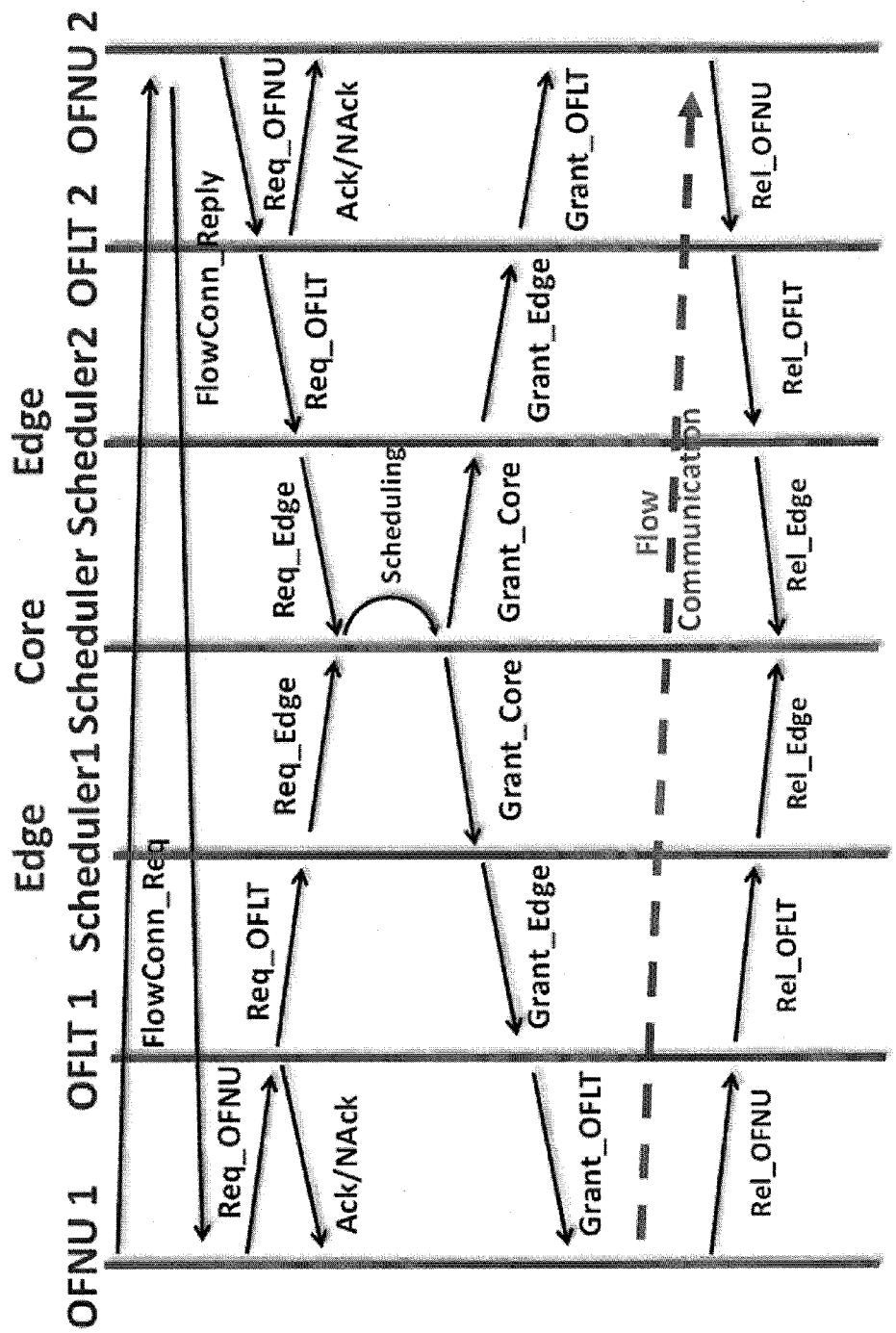
FIG. 8B shows an example process for establishing a flow switching connection using a rendezvous scheduling protocol, consistent with various aspects of the present disclosure.

FIG. 8(B) shows a second example process for establishing a flow switching connection using a rendezvous scheduling protocol. The rendezvous scheduling protocol is similar to the distributed scheduling protocol shown in FIG. 8(A) except that both end-of-network users send a flow connection request to their managing OFLT after the initial negotiation. The two flow connection requests will rendezvous at the core scheduler and provoke the scheduling process in the core network. The rest of the protocol is identical to that in the distributed scheduling protocol.

Figure 9:
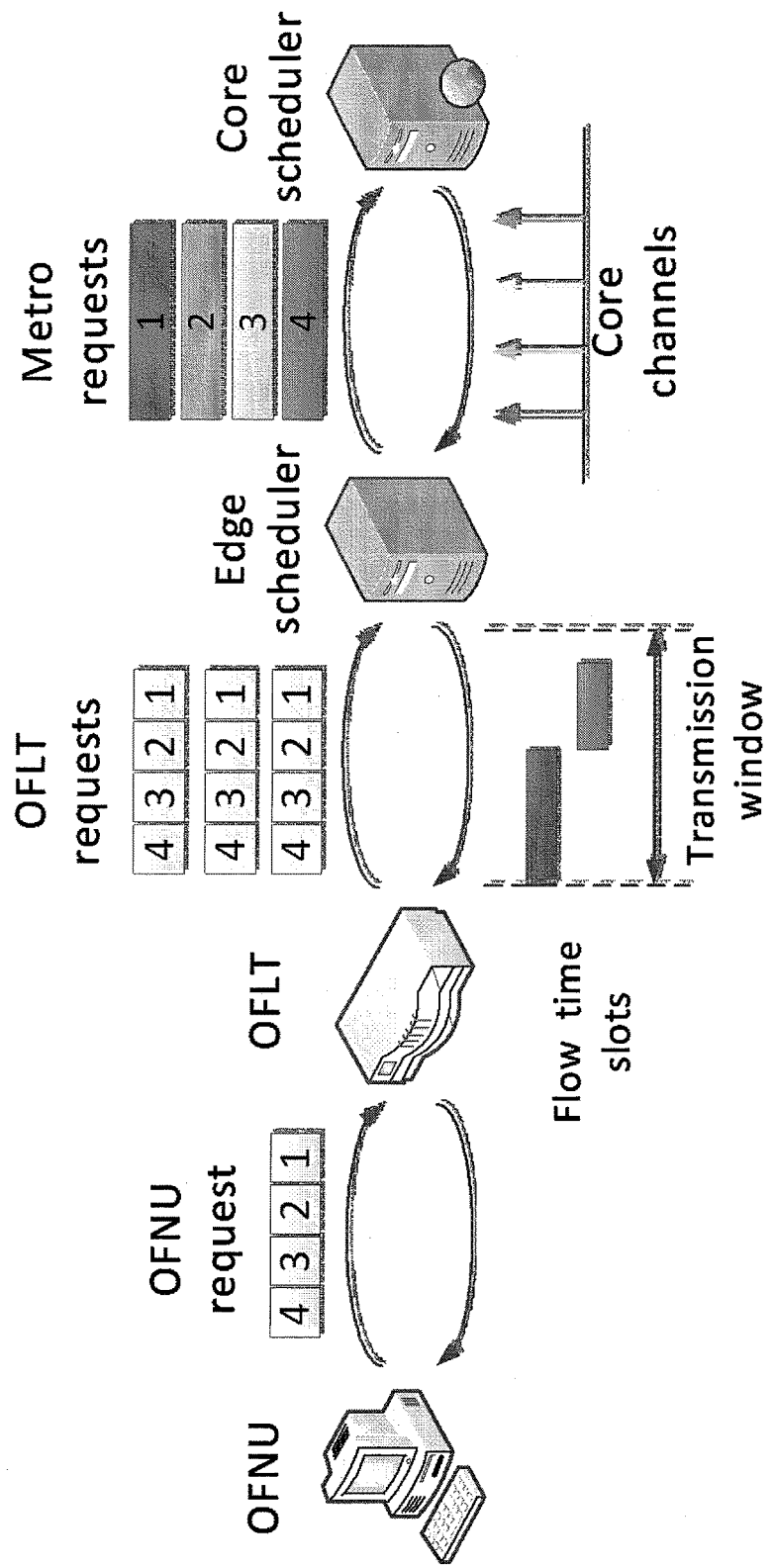
FIG. 9 shows an example process for decentralized hierarchical scheduling, consistent with various aspects of the present disclosure.

FIG. 9 shows a process for decentralized hierarchical scheduling. The scheduling of flow connection requests is decentralized to the scheduler in each network domain (i.e., WAN, MAN and access network). The core scheduler determines the route, wavelength and the time session for flow switching transmission in the core network. The edge scheduler allocates the granted resources in the core network to subordinate dual-mode access networks. The OFLT further divides the allocated wavelength session to each particular flow connection request.

The scheduling processes may be used to schedule flow connection requests individually or in batches. In some embodiments, a scheduler is implemented so all flow connection requests that arrive within a prescribed flow transmission window are aggregated for scheduling in a predefined transmission window. The scheduling in the OFLT allocates wavelength sessions to each request in a batch using an integer linear programming based batch scheduling. Once the scheduled flow switching transmission starts, in some embodiments, newly arrived flow connection requests are allocated with previously unoccupied bandwidth on-the-fly. The transmission window can also be dynamically adjusted according to real-time flow switching traffic load.

Figure 10A:
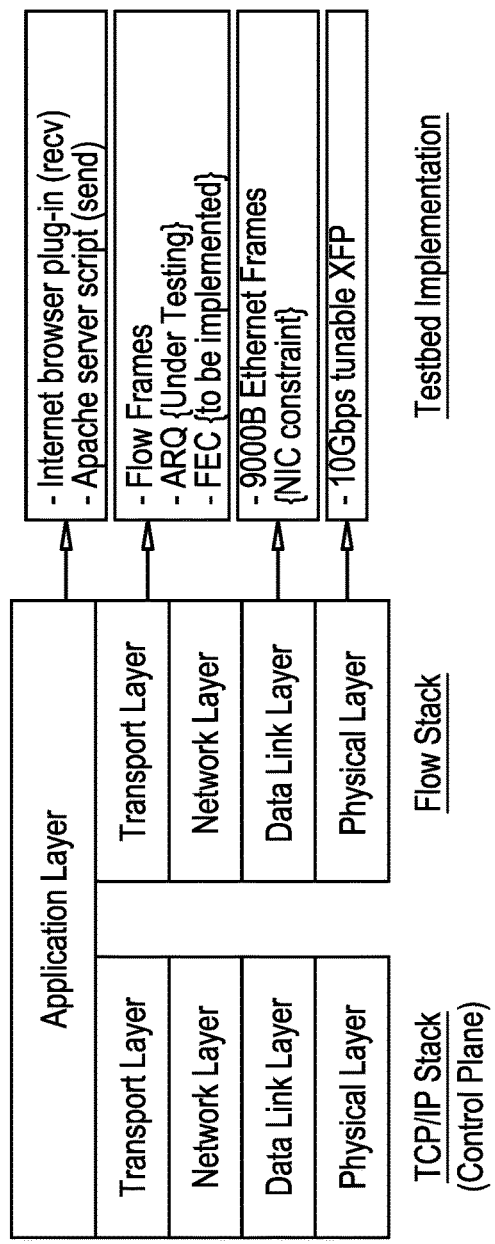
FIGS. 10A-B show an example dual-mode network stack that is implemented at the OFNU, consistent with various aspects of the present disclosure.
Figure 10B:
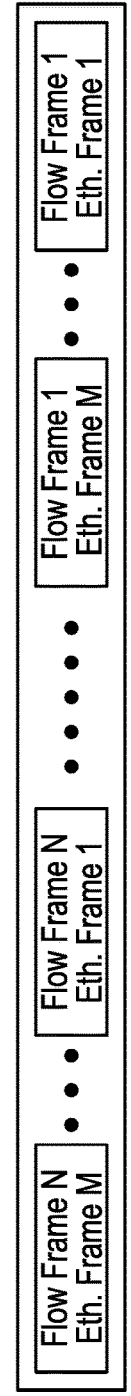

In a number of embodiments, an UltraFlow user can access both the IP and flow media simultaneously. FIGS. 10A-B show a dual-mode network stack that implemented at the OFNU. For example, FIG. 10A illustrates the dual-mode network stack and FIG. 10B illustrates the flow frames. For general information regarding a dual-mode network stack and for specific information regarding network aspects that may be implemented in accordance with one or more embodiments, reference may be made to Kazovsky, L. G., Dhaini, A. R., De Leenheer, M., Shen, T. S., Yin, S. and Detwiler, B. A., "UltraFlow Access Networks: A dual-mode solution for the access bottleneck," ICTON, Tu.C3.1, 1-4 (2013), which is fully incorporated by reference herein. The flow network stack is "lightweight" and only requires the Application, Transport and Physical layers. The Network layer is unnecessary due to the point-to-point nature of a scheduled flow switching connection between any two OFNUs, which are pre-registered at the network controller(s). Similarly, the Data Link layer is not needed.

Rather, the framing (i.e., the construction of a flow frame) and error control mechanisms are implemented in the Transport layer.

In some embodiments, the Application layer is shared between the TCP/IP and flow stacks so as to offer seamless transition from one medium to another. To facilitate this salient UltraFlow feature, a plug-in may be installed at the receiver side's application (e.g., an Internet browser), which typically requests to download a large file from the sender's application (e.g., an Apache Server, which also requires a plug-in to identify the type of request) using HTTP.

The transport layer/protocol is commonly responsible for ensuring reliable delivery of data between any pair of network entities. It is also responsible for performing congestion control and fair resource management. TCP is a prominently and widely used protocol that supports all of these features. However, TCP can lead to low throughput and high latency resulting from windowing and timeouts, which makes it not suitable for UltraFlow. Furthermore with OFS/UltraFlow where connections are scheduled over a "reliable" physical path (i.e., optical fiber), the congestion control overhead of TCP becomes inefficient. Hence, a new transport plane and protocol is designed to achieve optimal flow throughput. The new protocol must comply with the following salient design principles: (1) maximum payload throughput, and (2) reliable delivery of data.

The first design principle is achieved by using large flow frames, which should theoretically be in the order of thousands of megabytes. For additional information regarding use of large flow frames, reference may be made to Huang, H. P., "Transport layer protocol design over flow-switched data networks," Thesis (S. M.), Massachusetts Institute of Technology, Dept. Of Electrical Engineering and Computer Science, 1-136 (2012), which is fully incorporated by reference herein. Unfortunately, currently available NICs are constrained by the usage of Ethernet as a Layer-2 protocol. Therefore, in order to optimize the flow switching transmission throughput, each flow frame may be constructed using multiple 9000-Bytes Jumbo Ethernet frames (see FIG. 10(B)). This adds extra overhead to the flow frame, and thus may not enable optimal payload throughput.

A flow frame is composed of frame delimiters (sequences to signal the start and the end of the frame), actual data, and potentially some redundant information for error detection and correction (see FEC section below). Flow frames may also include identification of the sender and receiver, information about the status and/or progress of the flow transfer (e.g., various counters), and information about the status of the sender or the content of the flow transfer.

Flow frame sizes are not necessarily fixed for all flow switching sessions. Rather, they may be negotiated between sender and receiver, based on: processing speed, memory availability, other capabilities of sender and receiver, total size of data transfer, congestion level of flow switching network (historic or current), error rates of flow switching network, both historic and current, and/or application-specific requirements such as latency.

In some embodiments, flow frames may be created on the fly in the OFNU in response to receiving data from a user for transmission. In some other embodiments, flow frames may be created by a user and provided to the OFNU for transmission. Flow frames may also be created by a user and stored in a persistent memory for later retrieval and transmission by the OFNU. This latter embodiment can prove useful to reduce processing requirements in some scenario applications (e.g., in case the same data is to be transferred multiple times). Likewise, an OFNU at a receiver may decode flow frames or output received flow frames (e.g., to a persistent memory) for later decoding.

As flow switching transfers are scheduled, the elapsed time needed to perform scheduling of flow switching transmission periods and notify the pair of flow users, can be used by the sender to start creating flow frames. These flow frames may be stored on persistent storage in the OFNU or on volatile memory such as RAM. Use of volatile memory may be useful where persistent storage is significantly slower than the flow switching channel, as typically volatile memory such as RAM is as fast or faster than the flow channel bandwidth.

Various embodiments may be configured to improve the speed at which flow frames may be retrieved from and written to persistent memory. In some embodiments, the OFNU may be configured to read/write from multiple storage disks in parallel. In applications where persistent storage is not sufficiently fast to feed the flow switching channel at line rate, flow frames may be stored in volatile memory. For example, in one embodiment a circular buffer of fixed size may be used to facilitate transfer of flow frames to and from the OFNU.

To achieve reliable delivery of data (i.e., the second design principle), the following techniques may be implemented: 1) Cyclic Redundancy Check (CRC) bits for error detection, 2) Forward Error Correction (FEC) techniques for error correction, and 3) Automatic Repeat reQuest (ARQ) techniques for retransmission of uncorrectable flow frames. These frames can be either retransmitted within the same scheduled time slot or during one in the future.

Figure 11:
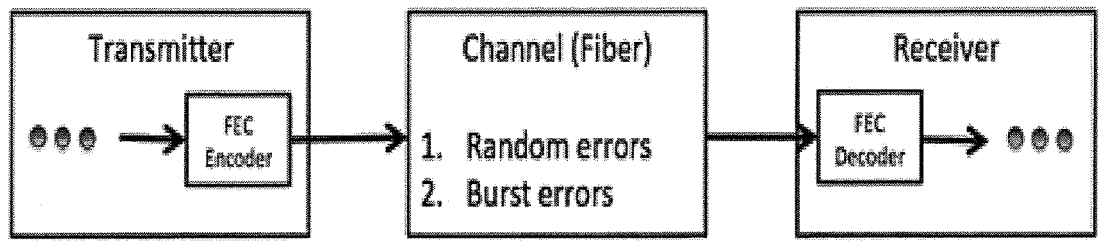
FIG. 11 shows an example Forward Error Correction (FEC) encoded at the last stage of transmission, consistent with various aspects of the present disclosure.
Figure 12:
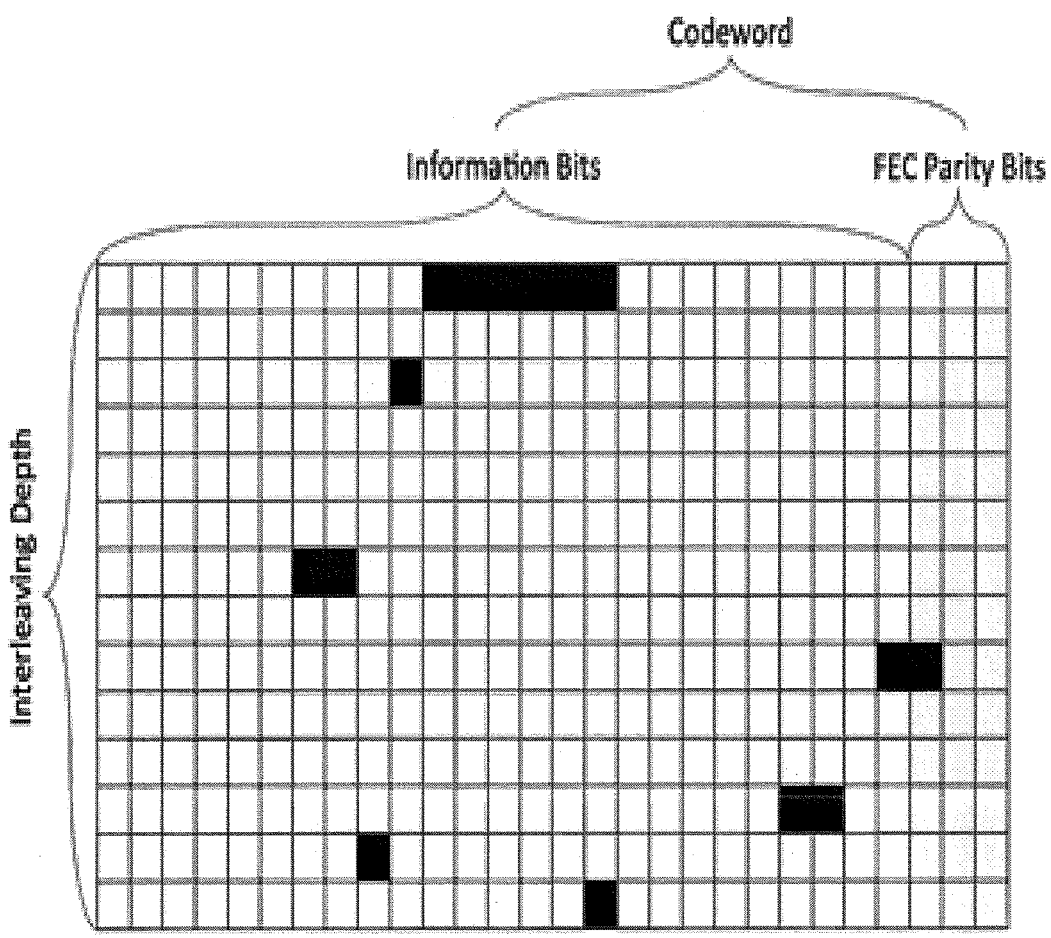
FIG. 12 shows an example of interleaving the input bit streams to decorrelate consecutive symbols, consistent with various aspects of the present disclosure.

FEC code may be used to enhance new flow channel transport layer performance, e.g., providing reliable channel, extending maximum link reach, etc. As shown in FIG. 11, FEC is encoded at the last stage of transmission; similarly, an FEC decoder is located at the first stage of the receiver in front of any following process. Two different errors can occur in the fiber channel, i.e., random and burst error. Random errors can be generally corrected. Burst errors are handled by interleaving the input bit streams to decorrelate consecutive symbols as in FIG. 12, i.e., symbols in any given codeword are transmitted at widely spaced intervals of time (usually 5~10× the burst error duration). The FEC may be customized to support large file transfers across the Access, metro-area and core networks. The FEC process may utilize various FEC codes including, but not limited to, Reed-Solomon codes, Cyclic codes or a hybrid combination of the two.

Figure 13:
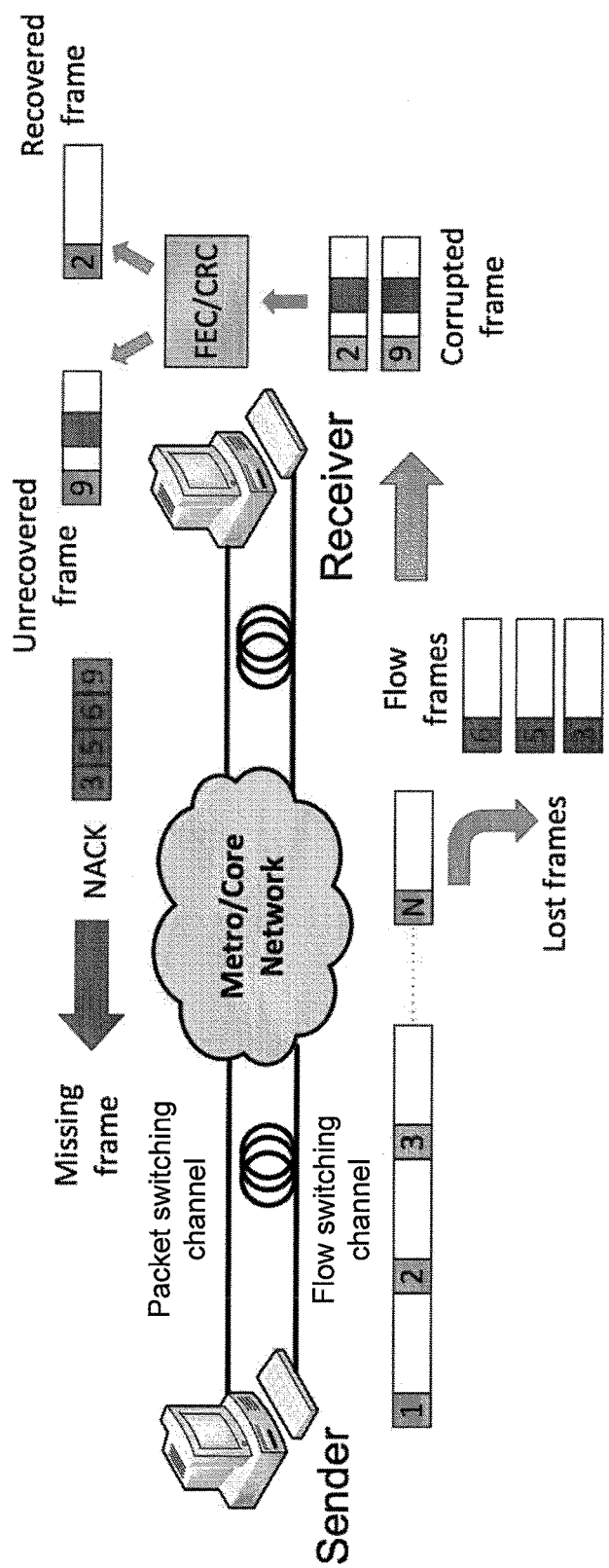
FIG. 13 shows an example Automatic Repeat reQuest (ARQ) process, consistent with various aspects of the present disclosure.

To ensure reliability, an ARQ process may be implemented at both the sender and receiver. The ARQ process is shown in FIG. 13. Large files are fragmented into flow frames. Frames are labeled/identified by sequence numbers and session ID. CRC and FEC are used to detect and correct corrupted frames. The IP channel is used to request retransmission of missing/erroneous frames. A NACK frame is sent upon detection of missing and/or unrecoverable frames. Erroneous or missing flow frames can be requested by the receiver either individually or in batches.

In some embodiments, the ARQ process may use ACK instead of NACK to report successful reception of flow frames. Subsequently, the flow queue contains the list of successfully received flow frames. Alternatively, in some embodiments, two flow queues (one for ACK'd and another one for NACK'd flow frames) are maintained both at the sender and receiver. Additionally, the sender may deduce, based on the packet switched network latency, the ACK or NACK packets that are still being transmitted. The sender can estimate the flow frames that have been successfully received based on the estimated transfer time of a NACK or ACK packet. At or after the decision, but before that end of the allocated transmission time, the current reservation may be cancelled and the allocated resources may be released. These can then be reused by the scheduler for other requests.

Various embodiments may utilize various physical layer implementations having different signal encodings and/or bitrates. In this example, the Physical layer is implemented using a C-band DWDM 10 Gbps tunable XFP transceiver over single-mode fiber (SMF).

The high data rate of flow switching service imposes minimum system requirements at the user's terminal equipment. In some embodiments, the terminal equipment is integrated with the OFNU. In some other embodiments, the terminal equipment is a stand-alone personal computer connecting to the OFNU (e.g., where the OFNU acts like a "Flow ONU").

Two of the system specifications that have major impacts on the flow switching channel throughput are the read/write speed of the hard drive and the size of the system memory. To analyze the impact of the foregoing specifications, consider a unidirectional data transmission between a sending user and a receiving user. Looking at the sending user, slow hard drive read speed forces the transmission process to pause until new data is pushed into the buffer. Consequently, the flow switching channel throughput is slashed. In some embodiments, to partially resolve this impact, a staging process is introduced in the system design. The data to be transmitted is preloaded into the system memory before the granted flow switching session starts. Once the flow switching transmission starts, the program implemented in the transport layer directly fetches data from the memory so that the flow switching channel throughput is no longer throttled by the speed of the hard drive. Meanwhile, a multithreaded reading process continues to read the file from the hard drive and fill in the transmission buffer with flow frames for later transmission. To fully exploit the staging process, sufficient system memory is required to compensate for the difference between the hard drive read/write speed and the flow switching transmission rate (e.g., more than 9 Gbps if a traditional HDD is installed in our testbed). If the memory size is not large enough to enable the staging process to build up sufficient lead in data buffering, the transmission process soon exhausts the preloaded data and becomes idle due to the latency in hard drive read/write speed.

To quantify this impact, some approaches show the relationship between the hard drive speed, system memory size and the flow switching channel throughput. Parameters used for an example approach are listed in Table 2.

TABLE 2

Variables for quantitative analysis
of system design impact on throughput

| Symbol | Definition | Example Value |
| --- | --- | --- |
| $T_s$ | Total staging time | [0, 50] s |
| $F_s$ | File size | 10 GB |
| M | Memory size | 4, 8, 16, 32 GB |
| $B_n$ | Bandwidth of flow switching channel | 10 Gbps |
| $B_h$ | Hard drive read speed | 1 Gbps (HDD) |
| | | 4 Gbps (1xSSD) |
| | | 2x4 Gbps (2xSSD) |

The total flow switching transmission time is given by:

$$T_{total} = \frac{F_1}{B_n} + \frac{F_2}{B_d},$$

where the size of the file portion preloaded into the buffer before flow switching transmission $F_1 = \min(F_s, M_s, B_d T_s)$ and the remainder file size to be read during the flow switching transmission $F_2 = F_s - F_1$.

Figure 14A:
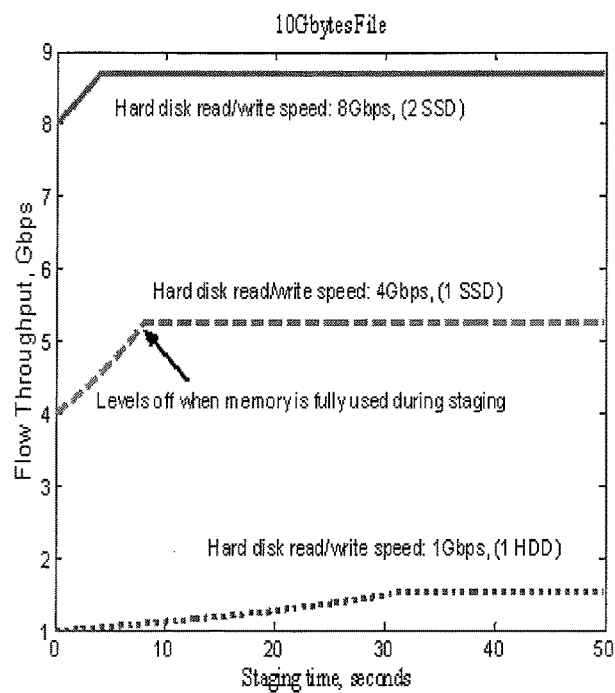
FIGS. 14A-B show examples of the impact of hard drive read speed and memory size on the end-to-end flow switching transmission throughput, consistent with various aspects of the present disclosure.
Figure 14B:
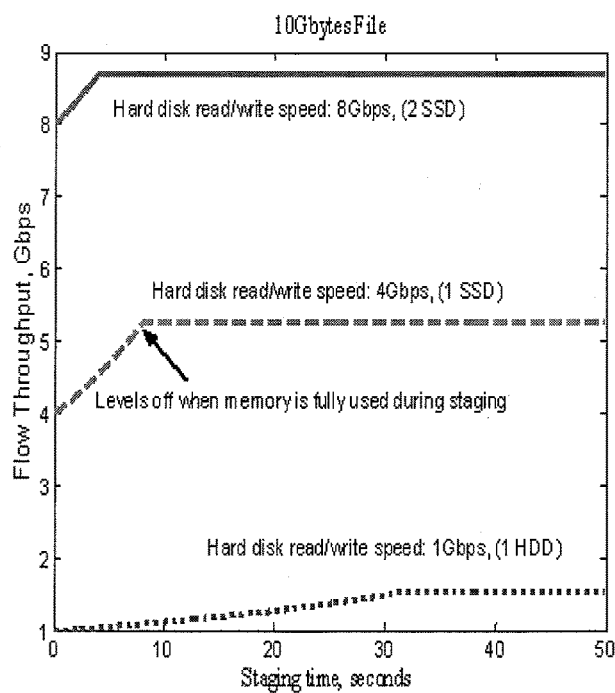

FIGS. 14(A) and 14(B) show the impact of hard drive read speed and memory size on the end-to-end flow switching transmission throughput, given a 10 GB file to be transferred. The results in FIG. 14(A) are obtained from an example system with 4 GB memory, while 32 GB memory is assumed to be installed on the example system that generates the curves in FIG. 14(B). As can be seen from both graphs, higher hard drive read speed increases the flow switching channel throughput for a given system memory. On the other hand, larger system memory size allows longer staging time and thus, helps improve the average channel throughput for a given hard drive read speed as the comparison between FIGS. 14(A) and (B) reveals. Similar to the situation on the transmitting end, discrepancy between the hard drive writing speed and flow switching transmission rate may cause packet drop on the receiving end due to buffer overflow. Since the staging process is not applicable in the receiving end, either provisioning sufficient buffer size or fast hard drive may be employed to avoid throttling of flow switching throughput.

In some embodiments, various system components (e.g., at a transmitter, receiver, and/or CO) are configured to provide an API to view and/or modify various parameters of components or flow switching transfers. In some embodiments, the API may be used, for example, for remote configuration and monitoring of optical components. For instance, it may be possible to tune a transceiver to a different wavelength through an API call from a remote location. Various parameters can also be read and monitored remotely, such as current laser temperature, bit error rate alarms, diode current, etc. The remote configuration may be used to manually configure parameters remotely or may be used to facilitate automatic software updates (e.g., driver firmware, the operating system, GUI, security fixes, etc.) Either the packet switched channel or the flow switching channel may be used to transfer software updates.

Figure 15:
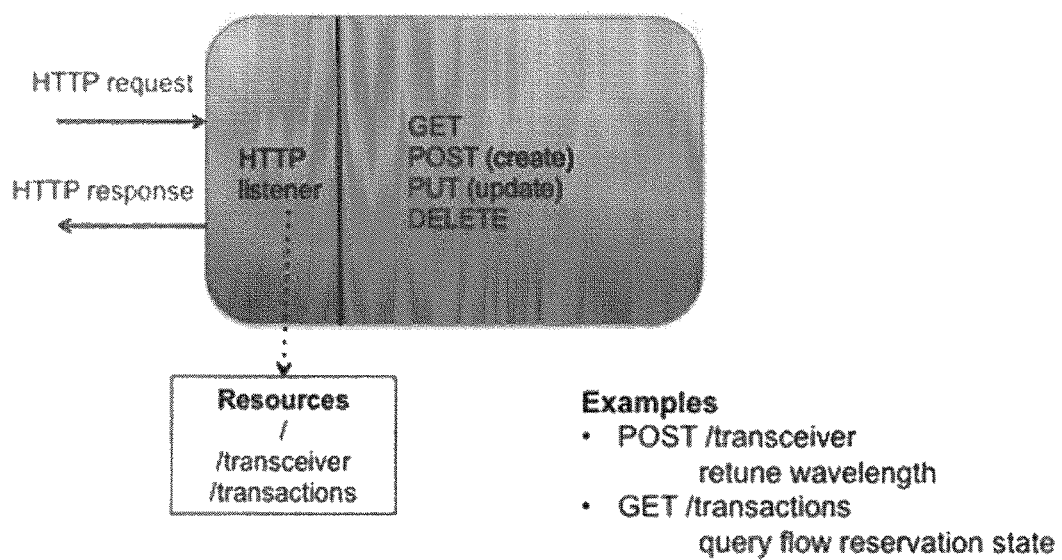
FIG. 15 shows an example Application Program Interface (API) configured to provide access to a resource using various HTTP commands, consistent with various aspects of the present disclosure.

FIG. 15 shows an example API configured to provide access to a resource using various HTTP commands. In one example embodiment, an API is provided that provides access to five resources (URLs) with the following HTTP commands. An 'index' resource supports the GET command and returns general information, configuration and status of the OFNU/OFLT. Such information configuration and status may include, for example, name, hostname, OFLT to which the OFNU is connected, number of transceivers, and/or current activity. A 'transceiver' resource supports GET and POST commands. The GET command may be used to receive current status of specified transceiver. The POST command may be used to change configuration of specified transceiver. For instance, the POST command may be used to tune the transceiver to a different wavelength. This interface is typically only exposed to a limited set of entities, for instance, a network administrator.

A 'transactions' resource supports GET, POST and DELETE commands. The GET command may be used—for specifying a unique transaction identifier and will return all status information about a transaction. The POST command may be used to create a new transaction. The DELETE command may be used to remove a transaction. A number of parameters may be specified for each transaction including, for example: identifiers for source and destination OFNUs; name of flow transfer; size of flow transfer; requested start and stop time for transfer; granted start and stop time for transfer; current state of transfer (which includes 'requested,' 'accepted,' in 'progress,' 'finished,' and 'failed'); a unique identifier for the transaction; scratch space for applications; granted channel (typically, to identify channel in optical C-band); and/or flow direction or mode, either 'TX' or 'RX'. An 'ARQ' resource supports a PUT command, which forwards the received ARQ messages to either the OFLT (using another REST call) or to the local network transport stack. A 'time' resource supports the GET command and returns the current local time of the OFNU/OFLT.

The API may be applied for use in a number of applications and services. For example, in an on-demand movie delivery application, the API may be used to set up a flow switching channel between the media distributor and the end-of-network user's OFNU for ultra-fast delivery of high-res movies. As another example, next generation game consoles may utilize the API to allow full games to be downloaded from the game distributor to the user premises. As another example, in the medical services context, the API may be used to exchange large medical files (CT scans, genome data, etc.) between medical facilities, clinical labs, patients and doctors, and can be facilitated through flow transfers. The API may also be used in a number of other applications that require large data files be exchanged. For example, video producers may edit and share large video files, architects may exchange complex 3D drawings, and bank branches may exchange large status report data with headquarters. As yet another example, the API may be used to facilitate server-to-server file transfers, e.g., snapshotting or migration of virtual machines. The API may also be used to enable users to remotely start and stop transfers. For instance, a smartphone app can interact with the API to download movies to the OFNU, irrespective of where the smartphone user is located. In some embodiments, the services on the OFNU may be accessed through a GUI, which can be presented on a display or TV, or through a remote application (e.g., web interface).

Figure 16:
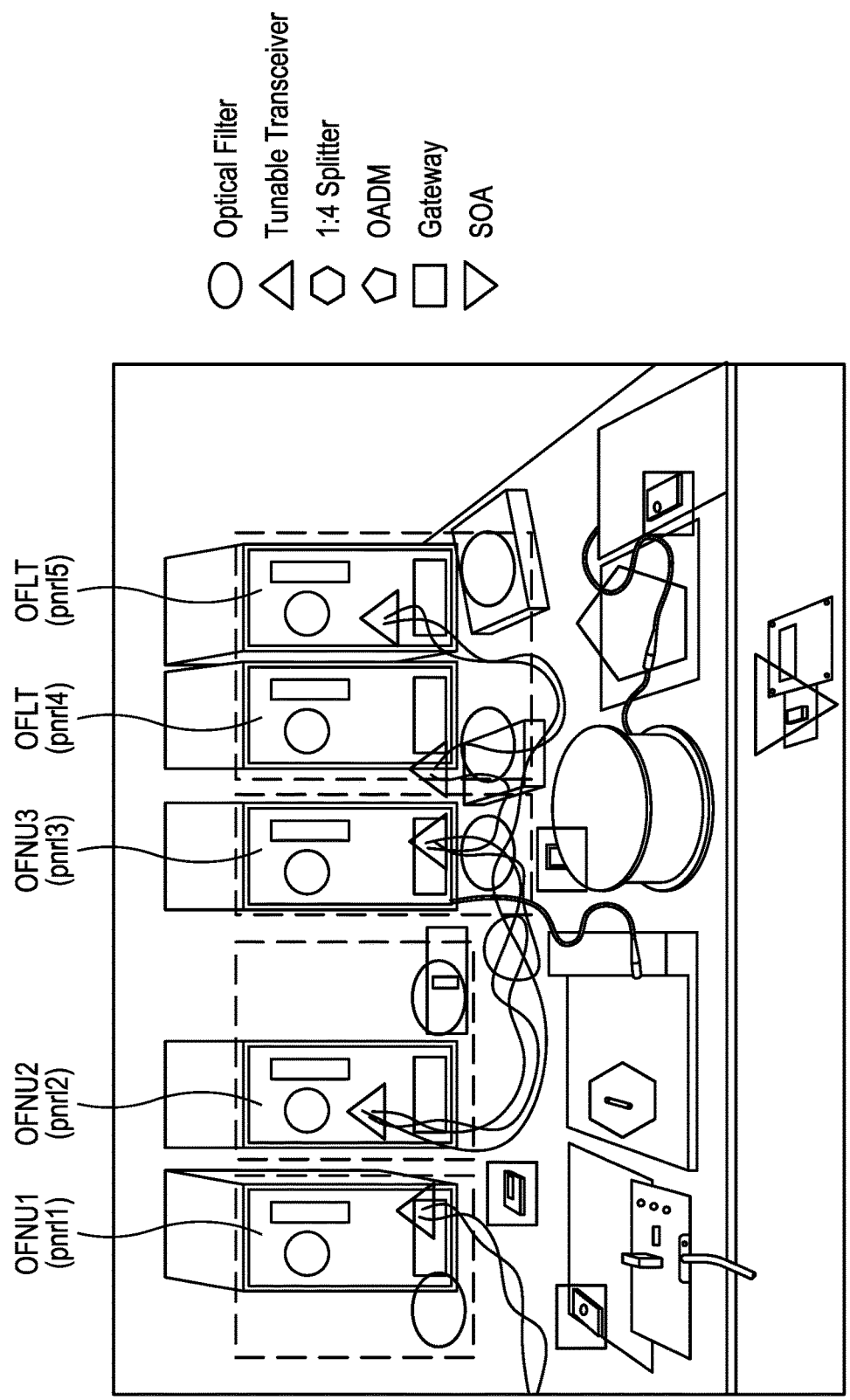
FIG. 16 shows an example testbed setup, consistent with various aspects of the present disclosure.

In accordance with some embodiments, a testbed to experimentally characterize the UltraFlow Access network depicted in FIG. 2C can be constructed. The testbed setup is shown in FIG. 16. The testbed includes three custom-designed and custom-built desktop computers pnrl1, pnrl2, and pnrl3, representing OFNU1, OFNU2 and OFNU3, respectively. The testbed also includes two additional custom-designed and custom-built desktop computers, pnrl4 and pnrl5, which jointly form the OFLT. Pnrl2 and pnrl5 are equipped with parallel high-speed solid-state disks (SSDs). The SSDs can provide up to 12 Gbps hard drive read/write speed. Conversely, hard disk drives (HDDs) are installed on pnrl1, pnrl3 and pnrl4. The HDDs exhibit less than 1 Gbps read/write speed. The hard drives read and write speeds can have great impact on the flow switching service throughput, especially when the transmitted flow file is read from the hard disk without employing staging.

In some approaches, three different transmission modes can be performed to analyze an impact of system design on the flow switching throughput, namely direct mode, staging mode, and dummy mode. In direct mode, the flow file is directly read from the hard drive and pushed into the memory buffer upon the start of flow switching transmission. This mode can be performed to analyze the flow switching system performance subject to the constraint of hard drive read/write speed. In the staging mode, the flow file to be transmitted is preloaded into the memory buffer before the flow switching transmission starts. Enough system memory (i.e., 16 GB) is installed at both the source and destination to ensure the accommodation of a complete flow file. The staging time is also set to allow complete preloading as per Eq. (1). Finally, in the dummy mode, the transmission buffer is filled with random data to analyze the system performance without any limitations imposed by the hard drive.

Table 3 illustrates example analysis of end-to-end flow switching throughput in the three modes for different machine pairs. As can be seen in the table, the hard drive speed can have a significant impact on the flow switching channel throughput; while compared to the benchmark throughput achieved in dummy mode, the proposed staging process which can remedy the hard drive constraint when enough system memory is installed in the system.

TABLE 3

Analysis of end-to-end flow throughput

| Machine pairs | Mode | Throughput (Gbps) |
|---|---|---|
| pnrl3 and pnrl4 | direct | 0.88 Gbps |
| | staging | 9.7 Gbps |
| | dummy | 9.7 Gbps |
| pnrl2 and pnrl5 | direct | 9.7 Gbps |
| | staging | 9.7 Gbps |
| | dummy | 9.7 Gbps |

In the direct mode, the slower write speed of SSD compared to its read speed can produce buffer overflow and packet drops at the receiving end. To overcome this, enough system memory size can be used to "buffer" the discrepancy between the flow switching throughput and SSD write speed. An example minimum memory required for error free transmission of a 14 GB file size in the example testbed in direct mode can be around 5 GB. Otherwise, packet drops can occur due to the overflow of the receiving buffer.

Various ones of the detailed/experimental embodiments describe specific features that may not be required in some other embodiments. Accordingly, various ones of the detailed/experimental embodiments may not correspond to all contemplated embodiments. Further, the various embodiments and specific features described herein can be used in a variety of combinations with other embodiments and/or specific features.

Various blocks, units, modules or other circuits may be implemented to carry out one or more of the operations and activities described herein and/or shown in the figures. In these contexts, a "block" (also sometimes "logic circuitry", "module", or "unit") is a circuit that carries out one or more of these or related operations/activities (e.g., ONU, OFNU, Gateway, OLT or OFLT). For example, in certain of the above-discussed embodiments, one or more modules are discrete logic circuits or programmable logic circuits configured and arranged for implementing these operations/activities, as in the circuit modules shown in FIG. 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities. For instance, in some embodiments, the dual layer stack used in the OFNU may be implemented by software running on a computing system (e.g., a microcontroller).

The below-listed Appendices (from and appended as part of the U.S. Provisional Application Ser. No. 61/936,629), are fully incorporated herein by reference for their general and specific teachings. Exemplary teachings therein concern optical networking, passive optical network architecture, optical flow switching, optical access technologies, and dynamic bandwidth applications. As such, various specific embodiments can be implemented using communication approaches, protocols, circuitry and other components as noted in the Appendices. These specific embodiments, may, for example, be implemented in accordance with the access networks shown in FIG. 1, in the networks and componentry shown in various other figures, as well as with method-based aspects characterized herein. Using, for example, Appendix 1, Appendix 2, and Appendix 3 as being representative of the above-noted exemplary teachings, each shows OFS networks or UltraFlow Access Networks, which can be incorporated with FIG. 1 of the present disclosure.

[1] Chan, V. W. S., "Optical Flow Switching Networks," Proc. IEEE, 100(5), 1079-1091 (2012).

[2] Weichenberg, G., Chan, V. W. S. and Médard, M., "Design and analysis of optical Flow-switched networks," IEEE J. Opt. Commun. Netw., 1(3), 81-97 (2009).

[3] Kazovsky, L. G., Dhaini, A. R., De Leenheer, M., Shen, T. S., Yin, S. and Detwiler, B. A., "UltraFlow Access Networks: A dual-mode solution for the access bottleneck," ICTON, Tu.C3.1, 1-4 (2013).

[4] Choi, K. M., Moon, J. H., Lee, J. H. and Lee, C. H., "An Evolution Method from a TDM-PON with a Video Overlay to a WDM-PON," IEEE Photonics Technol. Lett., 20(4), 312-314 (2008).

[5] ITU-T Study Group 15, "Gigabit-capable passive optical networks (GPON): General characteristics," Recommendation ITU-T G.984.1, 1-33 (2008).

[6] Dhaini, A. R., Assi, C. M., Maier, M. and Shami, A., "Dynamic Wavelength and Bandwidth Allocation in Hybrid TDM/WDM Ethernet Passive Optical Networks (EPONs)," J. Lightw. Technol., 25(1), 277-286 (2007).

[7] Chen, B., Chen, J. and He, S., "Efficient and fine scheduling algorithm for bandwidth allocation in Ethernet passive optical networks," IEEE J. Sel. Topics Quantum Electron., 12(4), 653-660 (2006).

[8] Kramer, G. and Mukherjee, B., "Supporting differentiated classes of service in Ethernet passive optical networks," IEEE J. Opt. Commun. Netw., 1(8), 280-298 (2002).

Based upon the above discussion and illustrations, those skilled in the art will readily recognize that various modifications and changes may be made to the various embodiments without strictly following the exemplary embodiments and applications illustrated and described herein. For example, such modifications do not depart from the true spirit and scope of various aspects of the invention, including aspects set forth in the claims.

For general information and for specifics regarding applications and implementations to which one or more embodiments of the present disclosure may be directed to and/or applicable, to the underlying U.S. Provisional Patent Application Ser. No. 61/936,629 filed on Feb. 6, 2014 (including the Appendices therein) to which priority is claimed and which are fully incorporated herein by reference. In view of the description herein, those skilled in the art will recognize that many changes may be made thereto without departing from the spirit and scope of the present disclosure.

What is claimed is:

1. An apparatus comprising:
a first gateway circuit in an optical access network connecting a plurality of end-of-network users to a central node, the first gateway circuit connecting one of the plurality of end-of-network users to the central node via fiber optic data lines, wherein
the first gateway circuit is configured and arranged to
relay a first set of data between the end-of-network user and the central node using a packet-switching communication protocol, and
relay a second set of data between the end-of-network user and the central node using an optical flow switching communication protocol; and
a second gateway circuit configured to communicate data to and from the end-of-network user via the first gateway circuit, and
an optical flow line terminal configured and arranged to route data between the second gateway circuit and a metro-area network or a core network using the optical flow switching communication protocol.

2. The apparatus of claim 1, further comprising:
an optical flow network unit located at a location of the end-of-network user and configured and arranged to communicate data between the end-of-network user and the central node via the first gateway circuit using the optical flow switching communication protocol; and
a packet-switching network unit located at a location of the end-of-network user and configured and arranged to communicate data between the end-of-network user and the central node via the first gateway circuit using the packet switching communication protocol.

3. The apparatus of claim 1, wherein:
the first gateway circuit is configured to relay data over the fiber optic data lines using a plurality of frequency bands,
for data communicated using the packet switching communication protocol, the first gateway circuit is configured and arranged to relay the data over the fiber optic data lines using a first set of frequency bands, and
for data communicated using the optical flow switching communication protocol, the first gateway circuit is configured and arranged to relay the data over the fiber optic data lines using a scheduled one of a plurality of frequency bands, which do not include the first set of frequency bands.

4. The apparatus of claim 3, wherein:
the first set of frequency bands includes
a first frequency band that is in or overlaps with a frequency range corresponding to wavelengths between 1260 and 1360 nm, and
a second frequency band that is in or overlaps with a frequency range corresponding to wavelengths between 1484.5 and 1497.5 nm; and the plurality of frequency bands that are in or overlaps with a frequency range corresponding to wavelengths between 1504.5 and 1620 nm.

5. The apparatus of claim 1, wherein the first gateway circuit is further configured and arranged to separate downstream data communicated from the central node with the packet switching communication protocol from downstream data communicated from the central node with the optical flow switching communication protocol based on a frequency band used for the communication.

6. The apparatus of claim 1, wherein the first gateway circuit is further configured and arranged to combine upstream data communicated from the end-of-network user with the packet switching communication protocol from upstream data communicated from the end-of-network user with the optical flow switching communication protocol based on a frequency band used for the communication.

7. An apparatus comprising:
a first gateway circuit in an optical access network connecting a plurality of end-of-network users to a central node, the first gateway circuit connecting one of the plurality of end-of-network users to the central node via fiber optic data lines, wherein
the first gateway circuit is configured and arranged to
relay a first set of data between the end-of-network user and the central node using a packet-switching communication protocol, and
relay a second set of data between the end-of-network user and the central node using an optical flow switching communication protocol; and at the central node:
a second gateway circuit configured to communicate data to and from the end-of-network user via the first gateway circuit;
a packet switching optical line terminal configured and arranged to route data between the second gateway circuit and a metro-area network or a core network using the packet switching communication protocol; and
an optical flow line terminal configured and arranged to route data between the second gateway circuit and a metro-area network or a core network using the optical flow switching communication protocol.

8. The apparatus as in claim 7, wherein control data for the optical flow switching communication protocol is communicated between the end-of-network user and the central node using the packet-switching communication protocol.

9. The apparatus of claim 7, wherein the central node is configured and arranged to, in response to receiving data from the end-of-network user that is communicated using the optical flow switching communication protocol, transmit control data to the end-of-network user using the packet-switching communication protocol.

10. An apparatus comprising:
a communication circuit configured and arranged to communicate data in an access network connecting a plurality of end-of-network users to a central node, the communication circuit including
an optical flow network unit configured and arranged to communicate data between an end-of-network user and the central node in the access network using an optical flow switching communication protocol; and
a packet switching network unit configured and arranged to communicate data between the end-of-network user and the central node in the access network using a packet switching communication protocol, wherein the communication circuit is further configured to communicate upstream data from the end-of-network user using the optical flow network unit, in response to a control signal having a first value, and communicate upstream data from the end-of-network user using the packet switching network unit, in response to a control signal having a second value.

11. The apparatus of claim 10, wherein the optical flow network unit is configured and arranged to communicate data between multiple end-of-network users connected thereto and the central node of the access network.

12. The apparatus of claim 11, wherein the optical flow network unit circuit is configured and arranged to multiplex data from the multiple end-of-network users and communicate the multiplexed data using the optical flow switching communication protocol.

13. The apparatus of claim 11, wherein the optical flow network unit is configured to provide a virtual optical flow network unit for each of the multiple end-of-network users.

14. The apparatus of claim 10, wherein the optical flow network unit is configured and arranged to support remote configuration of one or more configuration settings using an application programming interface.

15. The apparatus of claim 10, wherein:
the access network is a hybrid optical-fiber/coaxial-cable network, wherein the end-of-network user is connected to the optical flow network unit via an conductive transmission medium, and
the optical flow network unit is configured to relay data between the conductive transmission medium and an optical fiber connected to the central node in the access network.

16. The apparatus of claim 10, further comprising a gateway circuit configured and arranged to relay data between the communication circuit and the central node.

17. An apparatus comprising:
a communication circuit configured and arranged to communicate data in an access network connecting a plurality of end-of-network users to a central node, the communication circuit including
an optical flow network unit configured and arranged to communicate data between an end-of-network user and the central node in the access network using an optical flow switching communication protocol; and
a packet switching network unit configured and arranged to communicate data between the end-of-network user and the central node in the access network using a packet switching communication protocol, wherein the communication circuit is configured to, in response to receiving upstream data from the end-of-network user:
select one of the optical flow switching communication protocol or the packet switching communication protocol according to a selection algorithm; and
communicate the upstream data via the access network using the selected one of the communication protocols.

18. The apparatus of claim 17, wherein the selection algorithm is configured to select one of the optical flow switching communication protocol or the packet switching communication protocol based on at least one of a set of parameters including: file size, traffic congestion, bit error rates, quality of service deadlines, and contracted service level.

19. The apparatus of claim 17, further comprising a gateway circuit configured and arranged to relay data between the communication circuit and the central node.

20. The apparatus of claim 19, wherein the gateway circuit is further configured to:

separate downstream data communicated from the central node with the packet switching communication protocol from downstream data communicated from the central node with the optical flow switching communication protocol based on a frequency band used for the communication; and combine upstream data communicated from the end-of-network user with the packet switching communication protocol from upstream data communicated from the end-of-network user with the optical flow switching communication protocol based on a frequency band used for the communication.

* * * * *

UNITED STATES PATENT AND TRADEMARK OFFICE
CERTIFICATE OF CORRECTION

PATENT NO.        : 9,602,311 B2
APPLICATION NO.   : 14/616398
DATED             : March 21, 2017
INVENTOR(S)       : Ahmad R. Dhaini et al.

It is certified that error appears in the above-identified patent and that said Letters Patent is hereby corrected as shown below:

In the Specification

In Column 10, Line 59:
"The control plan" should read --The control plane--

In Column 12, TABLE 1, at Lines 12-13, numerical values 2 and 32 should be displayed under the second Column labeled Value, as shown below:

TABLE 1
Approach Parameters

| Parameters | Value |
| --- | --- |
| EPON bandwidth | 1 Gbps |
| Number of PONs | 2 |
| Number of ONUs per PON | 32 |
| Guard time | 1 μs |
| OLT/ONU queue size | 10 MB |
| Distance between ONUs and OLTs | 25 km |
| Downstream cycle time | 2 ms |

Signed and Sealed this
Twenty-sixth Day of September, 2017

Joseph Matal
*Performing the Functions and Duties of the
Under Secretary of Commerce for Intellectual Property and
Director of the United States Patent and Trademark Office*